US006101266A

United States Patent [19]

Laskowski et al.

[11] Patent Number: 6,101,266

[45] **Date of Patent: *Aug. 8, 2000**

[54] APPARATUS AND METHOD OF DETERMINING CONDITIONS OF BANK NOTES

[75] Inventors: Edward L. Laskowski, Seven Hills; Songtao Ma, Wadsworth, both of Ohio

[73] Assignee: Diebold, Incorporated, North Canton, Ohio

[ * ] Notice: This patent is subject to a terminal disclaimer.

[21] Appl. No.: 09/135,384

[22] Filed: Aug. 17, 1998

Related U.S. Application Data

[63] Continuation-in-part of application No. 08/749,260, Nov. 15, 1996, Pat. No. 5,923,413.

[51] Int. Cl.[7] .......... G06K 9/00

[52] U.S. Cl. .......... 382/135; 382/322

[58] Field of Search .......... 382/135, 165, 382/312, 318, 322; 356/71, 434, 435, 448; 250/559.11, 556; 194/207; 209/534

[56] References Cited

U.S. PATENT DOCUMENTS

| | | | |
|---|---|---|---|
| 3,496,370 | 2/1970 | Haville et al. | 250/219 |
| 3,782,543 | 1/1974 | Martelli et al. | 209/75 |
| 4,023,011 | 5/1977 | Nakajima et al. | 235/61.11 R |
| 4,147,430 | 4/1979 | Gorgone et al. | 356/51 |
| 4,159,054 | 6/1979 | Yoshida | 194/1 A |
| 4,163,570 | 8/1979 | Greenaway | 283/8 A |
| 4,176,783 | 12/1979 | Eppich | 235/474 |
| 4,179,685 | 12/1979 | O'Maley | 340/146.3 H |
| 4,183,665 | 1/1980 | Iannandrea et al. | 356/71 |
| 4,187,463 | 2/1980 | Kivenson | 324/228 |
| 4,204,765 | 5/1980 | Iannandrea et al. | 356/71 |
| 4,211,918 | 7/1980 | Nyfeler et al. | 235/454 |
| 4,234,844 | 11/1980 | Yuki | 324/58.5 A |
| 4,255,057 | 3/1981 | Williams | 356/435 |
| 4,255,652 | 3/1981 | Weber | 235/451 |
| 4,277,774 | 7/1981 | Fujii et al. | 340/146.3 Q |
| 4,283,708 | 8/1981 | Lee | 340/146.3 Z |
| 4,288,781 | 9/1981 | Sellner et al. | 340/146.3 Q |
| 4,302,781 | 11/1981 | Ikeda et al. | 358/288 |
| 4,309,602 | 1/1982 | Gonsalves et al. | 250/201 |
| 4,311,914 | 1/1982 | Huber | 250/556 |
| 4,319,137 | 3/1982 | Nakamura et al. | 250/556 |
| 4,348,656 | 9/1982 | Gorgone et al. | 340/146.3 R |
| 4,349,111 | 9/1982 | Shah et al. | 209/534 |
| 4,352,988 | 10/1982 | Ishida | 250/559 |
| 4,355,300 | 10/1982 | Weber | 34/146.3 C |
| 4,383,275 | 5/1983 | Sasaki et al. | 358/280 |
| 4,386,432 | 5/1983 | Nakamura et al. | 382/7 |

(List continued on next page.)

FOREIGN PATENT DOCUMENTS

| | | | |
|---|---|---|---|
| 3621093 | 9/1987 | Germany | B65H 7/12 |
| 7-172629 | 7/1995 | Japan | B65H 7/12 |
| 8-055255 | 2/1996 | Japan | G07D 7/00 |

*Primary Examiner*—Andrew W. Johns
*Attorney, Agent, or Firm*—Ralph E. Jocke; Christopher L. Parmelee

[57] ABSTRACT

An apparatus and method for providing an indication of a type and/or a condition of a note passing through the apparatus includes a note transport (12) which moves the note past transversely spaced spot sensing assemblies (18). Each spot sensing assembly includes four emitters (32). Each of the emitters produces radiation at different wavelengths. The spot sensing assemblies include a reflectance detector (20) and a transmission detector (22) which are disposed on opposed sides of the passing note. The emitters direct radiation onto test spots (34) on the passing note. Radiation reflected from and transmitted through the test spots is detected by the respective reflector and transmission detectors. A control circuit (24) produces sensed values that correspond to the detected radiation. A data store in operative connection with the control circuit comprises memories (138) that include stored data representative of transition and reflectance values for know note types. The control circuit calculates a level of correlation between the stored values and the sensed values. By comparing the correlated values to threshold values, the control circuit is operative to determine the type of note and other conditions such as if a note is worn, soiled, or a doubles note.

39 Claims, 10 Drawing Sheets

U.S. PATENT DOCUMENTS

| | | | |
|---|---|---|---|
| 4,399,553 | 8/1983 | Toyama | 382/7 |
| 4,429,991 | 2/1984 | Williams | 356/73 |
| 4,435,834 | 3/1984 | Pauli et al. | 382/7 |
| 4,442,541 | 4/1984 | Finkel et al. | 382/7 |
| 4,461,028 | 7/1984 | Okubo | 382/15 |
| 4,464,786 | 8/1984 | Nishito et al. | 382/7 |
| 4,464,787 | 8/1984 | Fish et al. | 382/7 |
| 4,465,925 | 8/1984 | Goi | 235/379 |
| 4,472,627 | 9/1984 | Weinberger | 235/487 |
| 4,482,058 | 11/1984 | Steiner | 209/534 |
| 4,486,098 | 12/1984 | Buchegger et al. | 356/445 |
| 4,487,306 | 12/1984 | Nao et al. | 194/4 |
| 4,490,846 | 12/1984 | Ishida et al. | 382/7 |
| 4,500,002 | 2/1985 | Koshio et al. | 209/534 |
| 4,501,439 | 2/1985 | Antes | 283/91 |
| 4,504,084 | 3/1985 | Jauch | 283/94 |
| 4,513,439 | 4/1985 | Gorgone et al. | 382/7 |
| 4,514,085 | 4/1985 | Kaye | 356/71 |
| 4,524,276 | 6/1985 | Ohtombe | 250/338 |
| 4,537,504 | 8/1985 | Baltes et al. | 356/71 |
| 4,538,791 | 9/1985 | Wostal | 251/339 |
| 4,539,702 | 9/1985 | Oka | 382/7 |
| 4,542,829 | 9/1985 | Emery et al. | 209/534 |
| 4,546,869 | 10/1985 | Dean et al. | 194/99 |
| 4,550,433 | 10/1985 | Takahashi | 382/7 |
| 4,556,140 | 12/1985 | Okada | 194/4 C |
| 4,558,224 | 12/1985 | Gober et al. | 250/461.1 |
| 4,563,771 | 1/1986 | Gorgone et al. | 382/7 |
| 4,572,349 | 2/1986 | Furuya et al. | 194/318 |
| 4,584,529 | 4/1986 | Aoyama | 324/261 |
| 4,587,412 | 5/1986 | Apisdorf | 235/449 |
| 4,587,434 | 5/1986 | Roes et al. | 250/556 |
| 4,588,292 | 5/1986 | Collins | 356/71 |
| 4,591,799 | 5/1986 | Faillin et al. | 330/45 |
| 4,592,090 | 5/1986 | Curl et al. | 382/7 |
| 4,618,257 | 10/1986 | Bayne et al. | 356/71 |
| 4,628,194 | 12/1986 | Dobbins et al. | 235/379 |
| 4,645,936 | 2/1987 | Gorgone | 250/556 |
| 4,652,015 | 3/1987 | Crane | 283/91 |
| 4,653,647 | 3/1987 | Hashimoto | 209/534 |
| 4,659,112 | 4/1987 | Reiner et al. | 283/90 |
| 4,660,705 | 4/1987 | Kai et al. | 194/318 |
| 4,677,682 | 6/1987 | Miyagawa et al. | 382/7 |
| 4,678,072 | 7/1987 | Kobayashi et al. | 194/206 |
| 4,700,368 | 10/1987 | Munn et al. | 377/8 |
| 4,723,072 | 2/1988 | Naruse | 235/454 |
| 4,731,663 | 3/1988 | Kovalchick et al. | 358/101 |
| 4,733,308 | 3/1988 | Nakamura et al. | 358/288 |
| 4,749,074 | 6/1988 | Ueki et al. | 194/317 |
| 4,749,087 | 6/1988 | Buttifant | 209/534 |
| 4,754,862 | 7/1988 | Rawicz-Szczerbo et al. | 194/319 |
| 4,761,205 | 8/1988 | Crane | 162/103 |
| 4,794,585 | 12/1988 | Lee | 369/112 |
| 4,809,837 | 3/1989 | Hayashi | 194/205 |
| 4,823,393 | 4/1989 | Kawakami | 382/7 |
| 4,827,531 | 5/1989 | Milford | 382/29 |
| 4,834,230 | 5/1989 | Kondo et al. | 194/206 |
| 4,837,840 | 6/1989 | Goldman | 382/7 |
| 4,850,468 | 7/1989 | Kobayashi et al. | 194/207 |
| 4,858,744 | 8/1989 | Dolejs et al. | 194/206 |
| 4,864,238 | 9/1989 | Seitz | 324/253 |
| 4,880,096 | 11/1989 | Kobayashi et al. | 194/206 |
| 4,881,268 | 11/1989 | Uchida et al. | 382/77 |
| 4,884,671 | 12/1989 | Gardellini | 194/207 |
| 4,896,901 | 1/1990 | Ekelund | 283/90 |
| 4,906,829 | 3/1990 | Iseli | 235/494 |
| 4,908,516 | 3/1990 | West | 250/556 |
| 4,922,109 | 5/1990 | Bercovitz et al. | 250/556 |
| 4,922,110 | 5/1990 | Melcher | 250/556 |
| 4,947,441 | 8/1990 | Hara et al. | 382/7 |
| 4,966,304 | 10/1990 | Kelly | 221/6 |
| 4,973,851 | 11/1990 | Lee | 250/556 |
| 4,980,569 | 12/1990 | Crane | 250/556 |
| 4,996,604 | 2/1991 | Ogawa et al. | 358/474 |
| 5,004,327 | 4/1991 | Rosén | 350/398 |
| 5,007,520 | 4/1991 | Harris et al. | 194/317 |
| 5,010,243 | 4/1991 | Fukushima et al. | 235/488 |
| 5,027,415 | 6/1991 | Hara et al. | 382/7 |
| 5,034,616 | 7/1991 | Bercovitz | 250/556 |
| 5,044,707 | 9/1991 | Mallik | 359/2 |
| 5,047,871 | 9/1991 | Meyer et al. | 358/486 |
| 5,063,163 | 11/1991 | Carmeli | 436/94 |
| 5,068,519 | 11/1991 | Bryce | 235/449 |
| 5,076,441 | 12/1991 | Gerlier | 209/534 |
| 5,099,975 | 3/1992 | Ullman et al. | 194/227 |
| 5,101,184 | 3/1992 | Antes | 235/454 |
| 5,122,754 | 6/1992 | Gotaas | 324/676 |
| 5,151,607 | 9/1992 | Crane et al. | 250/556 |
| 5,167,313 | 12/1992 | Dobbins et al. | 194/317 |
| 5,199,543 | 4/1993 | Kamagami et al. | 194/207 |
| 5,201,395 | 4/1993 | Takizawa et al. | 194/206 |
| 5,210,398 | 5/1993 | Metlitsky | 235/462 |
| 5,222,584 | 6/1993 | Zouzoulas | 194/207 |
| 5,231,462 | 7/1993 | Dschen | 356/328 |
| 5,237,164 | 8/1993 | Takada | 235/487 |
| 5,242,041 | 9/1993 | Isobe | 194/207 |
| 5,259,490 | 11/1993 | Gardellini | 194/203 |
| 5,260,582 | 11/1993 | Danek et al. | 250/556 |
| 5,267,753 | 12/1993 | Chock | 283/58 |
| 5,276,396 | 1/1994 | Seitz | 324/239 |
| 5,279,403 | 1/1994 | Harbaugh et al. | 194/207 |
| 5,280,333 | 1/1994 | Wunderer | 356/71 |
| 5,283,422 | 2/1994 | Storch et al. | 235/375 |
| 5,295,196 | 3/1994 | Raterman et al. | 382/7 |
| 5,301,786 | 4/1994 | Yoshihara | 194/207 |
| 5,304,813 | 4/1994 | De Man | 250/556 |
| 5,308,992 | 5/1994 | Crane et al. | 250/556 |
| 5,315,511 | 5/1994 | Matsuura et al. | 364/408 |
| 5,330,041 | 7/1994 | Dobbins et al. | 194/206 |
| 5,341,408 | 8/1994 | Melcher et al. | 377/8 |
| 5,367,577 | 11/1994 | Gotaas | 382/7 |
| 5,374,825 | 12/1994 | Doty et al. | 250/372 |
| 5,377,805 | 1/1995 | Ono et al. | 194/206 |
| 5,381,019 | 1/1995 | Sato | 250/556 |
| 5,390,003 | 2/1995 | Yamaguchi et al. | 355/201 |
| 5,393,556 | 2/1995 | Romano | 427/7 |
| 5,394,969 | 3/1995 | Harbaugh | 194/286 |
| 5,399,874 | 3/1995 | Golsalves et al. | 250/556 |
| 5,405,131 | 4/1995 | Zouzoulas | 271/189 |
| 5,407,191 | 4/1995 | Ukai | 271/227 |
| 5,411,249 | 5/1995 | Zouzoulas | 271/186 |
| 5,411,436 | 5/1995 | Kaplan | 453/17 |
| 5,416,307 | 5/1995 | Danek et al. | 235/449 |
| 5,417,316 | 5/1995 | Harbaugh | 194/206 |
| 5,419,423 | 5/1995 | Ishida et al. | 194/206 |
| 5,419,424 | 5/1995 | Harbaugh | 194/206 |
| 5,420,406 | 5/1995 | Izawa et al. | 235/379 |
| 5,421,443 | 6/1995 | Hatamachi et al. | 194/206 |
| 5,427,036 | 6/1995 | Fee et al. | 109/46 |
| 5,427,462 | 6/1995 | Jackson et al. | 400/579 |
| 5,430,664 | 7/1995 | Cargill et al. | 364/550 |
| 5,432,506 | 7/1995 | Chapman | 340/825.34 |
| 5,434,427 | 7/1995 | Crane et al. | 250/556 |
| 5,437,357 | 8/1995 | Ota et al. | 194/206 |
| 5,437,897 | 8/1995 | Tanaka et al. | 428/29 |
| 5,438,403 | 8/1995 | Hoshino et al. | 356/71 |
| 5,443,144 | 8/1995 | Dobbins et al. | 194/317 |
| 5,450,937 | 9/1995 | Ono et al. | 194/203 |
| 5,462,149 | 10/1995 | Waine et al. | 194/206 |
| 5,467,405 | 11/1995 | Raterman et al. | 382/135 |
| 5,467,406 | 11/1995 | Graves et al. | 382/135 |
| 5,468,971 | 11/1995 | Ebstein et al. | 250/556 |
| 5,476,169 | 12/1995 | Takarada et al. | 194/207 |
| 5,922,959 | 7/1999 | Kayani | 73/597 |
| 5,923,413 | 7/1999 | Laskowski | 356/71 |

$$c_{x,y} = \frac{\sum (X_i - \mu_x)(y_i - \mu_y)}{\sigma_x \ \sigma_y}$$

94

| SCAN | GREEN REFL | | | RED REFL | | | BLUE REFL | | | IR REFL | | | GREEN TRANS | | | RED TRANS | | | BLUE TRANS | | | IR TRANS | | |
|---|---|---|---|---|---|---|---|---|---|---|---|---|---|---|---|---|---|---|---|---|---|---|---|---|
| | L | C | R | L | C | R | L | C | R | L | C | R | L | C | R | L | C | R | L | C | R | L | C | R |
| 1 | X | X | X | X | X | X | X | X | X | X | X | X | X | X | X | X | X | X | X | X | X | X | X | X |
| 2 | X | X | X | X | X | X | X | X | X | X | X | X | X | X | X | X | X | X | X | X | X | X | X | X |
| 3 | X | X | X | X | X | X | X | X | X | X | X | X | X | X | X | X | X | X | X | X | X | X | X | X |
| 4 | X | X | X | X | X | X | X | X | X | X | X | X | X | X | X | X | X | X | X | X | X | X | X | X |
| 5 | X | X | X | X | X | X | X | X | X | X | X | X | X | X | X | X | X | X | X | X | X | X | X | X |
| 6 | X | X | X | X | X | X | X | X | X | X | X | X | X | X | X | X | X | X | X | X | X | X | X | X |
| 7 | X | X | X | X | X | X | X | X | X | X | X | X | X | X | X | X | X | X | X | X | X | X | X | X |
| 8 | X | X | X | X | X | X | X | X | X | X | X | X | X | X | X | X | X | X | X | X | X | X | X | X |
| 9 | X | X | X | X | X | X | X | X | X | X | X | X | X | X | X | X | X | X | X | X | X | X | X | X |
| 10 | X | X | X | X | X | X | X | X | X | X | X | X | X | X | X | X | X | X | X | X | X | X | X | X |
| 11 | X | X | X | X | X | X | X | X | X | X | X | X | X | X | X | X | X | X | X | X | X | X | X | X |
| 12 | X | X | X | X | X | X | X | X | X | X | X | X | X | X | X | X | X | X | X | X | X | X | X | X |
| 13 | X | X | X | X | X | X | X | X | X | X | X | X | X | X | X | X | X | X | X | X | X | X | X | X |
| 14 | X | X | X | X | X | X | X | X | X | X | X | X | X | X | X | X | X | X | X | X | X | X | X | X |
| 15 | X | X | X | X | X | X | X | X | X | X | X | X | X | X | X | X | X | X | X | X | X | X | X | X |
| 16 | X | X | X | X | X | X | X | X | X | X | X | X | X | X | X | X | X | X | X | X | X | X | X | X |
| 17 | X | X | X | X | X | X | X | X | X | X | X | X | X | X | X | X | X | X | X | X | X | X | X | X |
| 18 | X | X | X | X | X | X | X | X | X | X | X | X | X | X | X | X | X | X | X | X | X | X | X | X |
| 19 | X | X | X | X | X | X | X | X | X | X | X | X | X | X | X | X | X | X | X | X | X | X | X | X |
| 20 | X | X | X | X | X | X | X | X | X | X | X | X | X | X | X | X | X | X | X | X | X | X | X | X |
| 21 | X | X | X | X | X | X | X | X | X | X | X | X | X | X | X | X | X | X | X | X | X | X | X | X |
| 22 | X | X | X | X | X | X | X | X | X | X | X | X | X | X | X | X | X | X | X | X | X | X | X | X |
| 23 | X | X | X | X | X | X | X | X | X | X | X | X | X | X | X | X | X | X | X | X | X | X | X | X |
| 24 | X | X | X | X | X | X | X | X | X | X | X | X | X | X | X | X | X | X | X | X | X | X | X | X |
| 25 | X | X | X | X | X | X | X | X | X | X | X | X | X | X | X | X | X | X | X | X | X | X | X | X |
| 26 | X | X | X | X | X | X | X | X | X | X | X | X | X | X | X | X | X | X | X | X | X | X | X | X |
| 27 | X | X | X | X | X | X | X | X | X | X | X | X | X | X | X | X | X | X | X | X | X | X | X | X |
| 28 | X | X | X | X | X | X | X | X | X | X | X | X | X | X | X | X | X | X | X | X | X | X | X | X |
| 29 | X | X | X | X | X | X | X | X | X | X | X | X | X | X | X | X | X | X | X | X | X | X | X | X |

X = SENSOR VALUE

FIG. 10

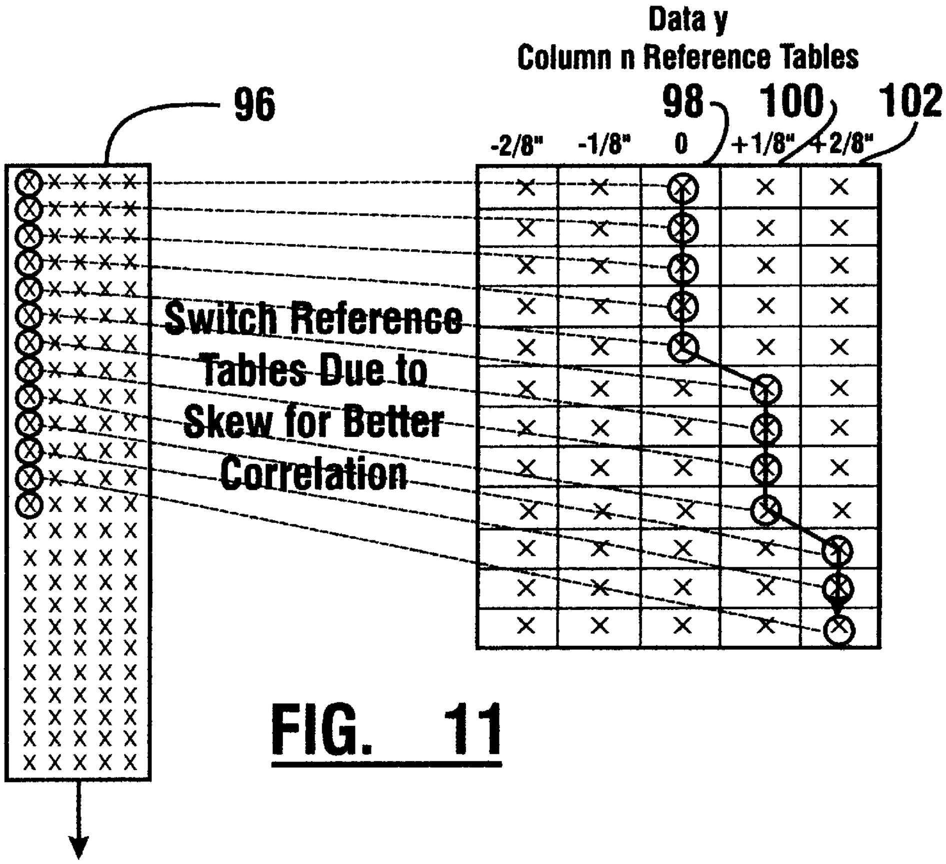

FIG. 11

APPARATUS AND METHOD OF DETERMINING CONDITIONS OF BANK NOTES

This application is a continuation-in-part of copending application Ser. No. 08/749,260 filed on Nov. 15, 1996, or now U.S. Pat. No. 5,923,413.

TECHNICAL FIELD

This invention relates to devices for identifying the type and validity of documents. Specifically this invention relates to devices and methods for identifying the denomination and authenticity of currency notes, and for determining conditions of currency notes.

BACKGROUND ART

Numerous devices have been previously developed for identifying documents and determining their authenticity. Likewise, devices have been previously developed for determining the denomination and authenticity of bank and currency notes. Such devices commonly test different properties of a presented note and based on the properties sensed, give an indication of the denomination and/or authenticity of the presented note. All such prior art devices have limitations.

Many prior art devices require precise alignment of the note during sensing of its properties. This requires the device to include a mechanism to align the notes and often limits the speed at which the notes can be processed. In addition, some devices require that presented notes be oriented in a particular way as they are sensed. This limits their usefulness as notes are often not presented in a uniform orientation.

Many prior art devices for determining note denomination and validity are capable of processing only a small number of note types. This presents drawbacks as other note types cannot be processed. Such prior art devices are also generally made to be used with only one type of currency such as the currency of a particular country. Often it is difficult or impossible to adapt such devices to handle currencies of countries which have different physical properties. Furthermore, it may be difficult to adapt such devices to a new printing series of notes within the same country.

Many prior art devices are also amenable to compromise by counterfeit notes. It is becoming easier to produce highly accurate counterfeit reproductions of currency. By mimicking the properties of a note that are tested by prior art currency denominators and validators, it is often possible to have counterfeit notes accepted.

To minimize the risk of acceptance of counterfeits, the range of the acceptance criteria in prior art devices can often be set more closely. However, currency notes in circulation change properties through use fairly quickly. Notes in circulation may change their properties through handling and wear. Notes may become dirty or marked with ink or other substances. Notes may also lose their color due to having been mistakenly washed with clothing or exposed to water or sunlight. Prior art currency denominators and validators may reject valid notes which exhibit such properties when the criteria for acceptance is set too tightly.

Note denominators and validators currently available may also be difficult to program and calibrate. Such devices, particularly if they must have the capability of handling more than one type of note, may require significant effort to set up and program. In addition, such devices may require initial calibration and frequent periodic recalibration and adjustment to maintain a suitable level of accuracy.

Prior art note denominators and validators, particularly those having greater capabilities, often occupy significant physical space. This limits where they may be installed. In addition, such devices also often have a relatively high cost which limits their suitability for particular uses and applications.

Prior art devices for determining the conditions of notes are not as effective and accurate as would be desired. For example, it is often desirable to determine that a note has a condition that requires special handling. This may include conditions such as that the note is a double note, that the note is soiled or that the note is worn. There is further often a desire to segregate notes, that although determined as genuine, have a condition that makes it undesirable to deliver the notes into circulation.

Thus, there exists a need for a currency note denominator and validator which is more accurate, has greater capabilities, is faster, smaller in size, and lower in cost. There further exists a need for an apparatus and method that may be used to accurately and reliably determine a condition of a note.

DISCLOSURE OF INVENTION

It is an object of the present invention to provide an apparatus that indicates the identity of a note.

It is a further object of the present invention to provide an apparatus that indicates the identity of a note, that operates rapidly.

It is a further object of the present invention to provide an apparatus that indicates the identity of a note, that does not require that the note have a particular alignment or orientation.

It is a further object of the present invention to provide an apparatus that indicates the identity of a note, that identifies notes exhibiting a variety of wear and aging conditions.

It is a further object of the present invention to provide an apparatus that indicates the identity of a note, that is capable of handling a wide variety of sizes and types of currency notes.

It is a further object of the present invention to provide an apparatus that indicates the identity of a note, that may be readily set up for operation.

It is a further object of the present invention to provide an apparatus that indicates the identity of a note, that is compact in size.

It is a further object of the present invention to provide an apparatus that indicates the identity of a note, that is economical to use and manufacture.

It is a further object of the present invention to provide an apparatus that indicates the identity of a note, that is reliable.

It is a further object of the present invention to provide a method for identifying a type associated with a note.

It is a further object of the present invention to provide a method for identifying a type associated with a note, that is accurate.

It is a further object of the present invention to provide a method for identifying a note, that is capable of identifying a condition of a note, such as a double, or wear and aging conditions.

It is a further object of the present invention to provide a method for identifying a note, which can be used with a wide variety of notes of various orientations.

It is a further object of the present invention to provide a method for identifying notes, that can be performed rapidly by a control circuit.

It is a further object of the present invention to provide a method for identifying a note, that can be used to identify notes that are not consistently aligned or in a particular orientation.

It is a further object of the present invention to provide a method for determining a condition of a note.

Further objects of the present invention will be made apparent in the following Best Modes for Carrying Out Invention and the appended claims.

The foregoing objects are accomplished in a preferred embodiment of the invention by an apparatus and method for providing an indication of the type of a note and/or for determining a condition of a note. The apparatus is preferably used for providing signals indicative of a denomination of a currency note. This apparatus may also provide an indication of note orientation and/or note authenticity. For purposes of this disclosure a note shall be considered to include any preprinted document of value.

The invention is preferably used in connection with a transport for moving notes. A plurality of spaced spot sensing assemblies are disposed transversely to a direction of note movement in a transport path through the transport. In a preferred form of the invention, three spot sensing assemblies are used, although other embodiments of the invention may include other numbers of such assemblies.

Each assembly includes a radiation source which comprises a plurality of emitters. Each emitter generates radiation at a different wavelength. In one preferred form of the invention four emitters are used. The emitters generally span the range of visible light as well as infrared. In one preferred form of the invention the emitters include in each assembly red, green, blue and infrared emitters. Each of the emitters in an assembly is aimed to illuminate a spot on a passing note.

Each spot sensing assembly includes a first detector. The first detector is positioned on a first side of the note as it passes in the note path through the transport. The first detector is preferably positioned in centered relation with respect to the emitters. The first detector senses radiation from the emitters reflected from the test spots on the note.

Each assembly also includes a second detector. The second detector is positioned on a second side of the note opposite the first detector. The second detector detects radiation from each emitter that passes through the test spots on the note.

The apparatus of the invention includes a circuit in operative connection with a data store. The circuit is operable to actuate each of the emitters in each spot sensing assembly in a sequence. In accordance with one form of the invention the sequence all of the emitters of the same type produce radiation simultaneously while all of the other types of emitters are off. Alternatively, the sequence may provide for emitters in the spot sensing assemblies to be turned on at different times. However, in one preferred embodiment only one emitter in each spot sensing assembly is active at any one time while the sensors are being read. The emitters are preferably activated in the sequence continuously.

The emitters are sequenced numerous times as the note in the transport passes adjacent to the spot sensing assemblies. As a result, three sets of test spots arranged in a line are sensed on each passing note.

For each test spot, the first detector which senses reflection produces a first signal responsive to each emitter. Each first signal is representative of the amount of radiation reflected from the test spot from a corresponding emitter. Likewise, the second detector produces second signals responsive to the amount of light transmitted through the test spot on the note from each emitter.

The circuit is operative to receive the first and second signals from the first and second detectors respectively, and to generate reflectance and transmission values in response thereto. For each test spot four reflectance and four transmission values are generated. Likewise, for each row of three test spots which are checked on the note simultaneously by the three spot sensing assemblies, twelve reflectance values and twelve transmission values are generated. In one preferred form of the invention generally about 29 rows of test spots are sensed as the note moves past the spot sensing assemblies. This results in the circuit generating about 348 reflective values and 348 transmission values per note.

The values in the data store include values corresponding to reflectance and transmission values for a number of note types in various orientations and spatial positions. The circuit is operative to generate stored value sets from the values in the data store. Stored value sets are generated based on the angle of skew of the note, which is detected as it passes the sensing assemblies. Numerous stored value sets are generated by the circuit, each corresponding to a particular note, denomination, note orientation, and note position.

The circuit is operative to calculate values representative of the levels of correlation between the sensed value set of reflectance and transmission values for the note, and each of the stored value sets. By comparing the level of correlation between the sensed value set and the stored value sets, a highest correlation value is determined. The highest level of correlation will be with a stored value set that corresponds to the particular denomination and orientation of the note which passed through the transport to produce the sensed value set. The circuit is operative to generate a signal indicative of the note type it identifies.

In one preferred form of the invention the circuit is operative to compare the highest correlation value with a set threshold value. Even worn notes and those that have been subject to abuse exhibit a relatively high level of correlation with a stored value set for the correct note type. If however, the level of correlation is not above the set threshold, then the note may not be identifiable, or it may be a counterfeit or it may be identified and determined to be unfit for reuse. The circuit generates signals indicative of these conditions.

The highest correlation value above the threshold for determining the note type may also be compared to further thresholds corresponding to note conditions. For example double notes, notes which are soiled or notes which are worn may be identified by comparing the highest correlation value with thresholds corresponding to notes exhibiting such conditions. The determination of note condition may also be made by using the highest correlation value above a threshold to identify the note type, and then comparing the reflectance and transmittance data characteristics, such as average values for one or more emitter types, to stored further thresholds corresponding to conditions for the note type. Alternatively, the determination of note conditions may be made without determination of the note type. This may be done based on sensing transmission and reflectance values for one or several frequencies of radiation at one or several test spots on a note. The transmission and reflectance values are processed together and compared to thresholds indicative of note conditions.

BRIEF DESCRIPTION OF THE DRAWINGS

FIG. 10 is a tabular representation of the data shown in FIG. 9 shifted for purposes of calculating a value representative of a level of correlation.

FIG. 11 is a schematic representation demonstrating how sensed value data from a skewed note is correlated with data stored in the data store of the invention.

BEST MODES FOR CARRYING OUT INVENTION

Figure 1:
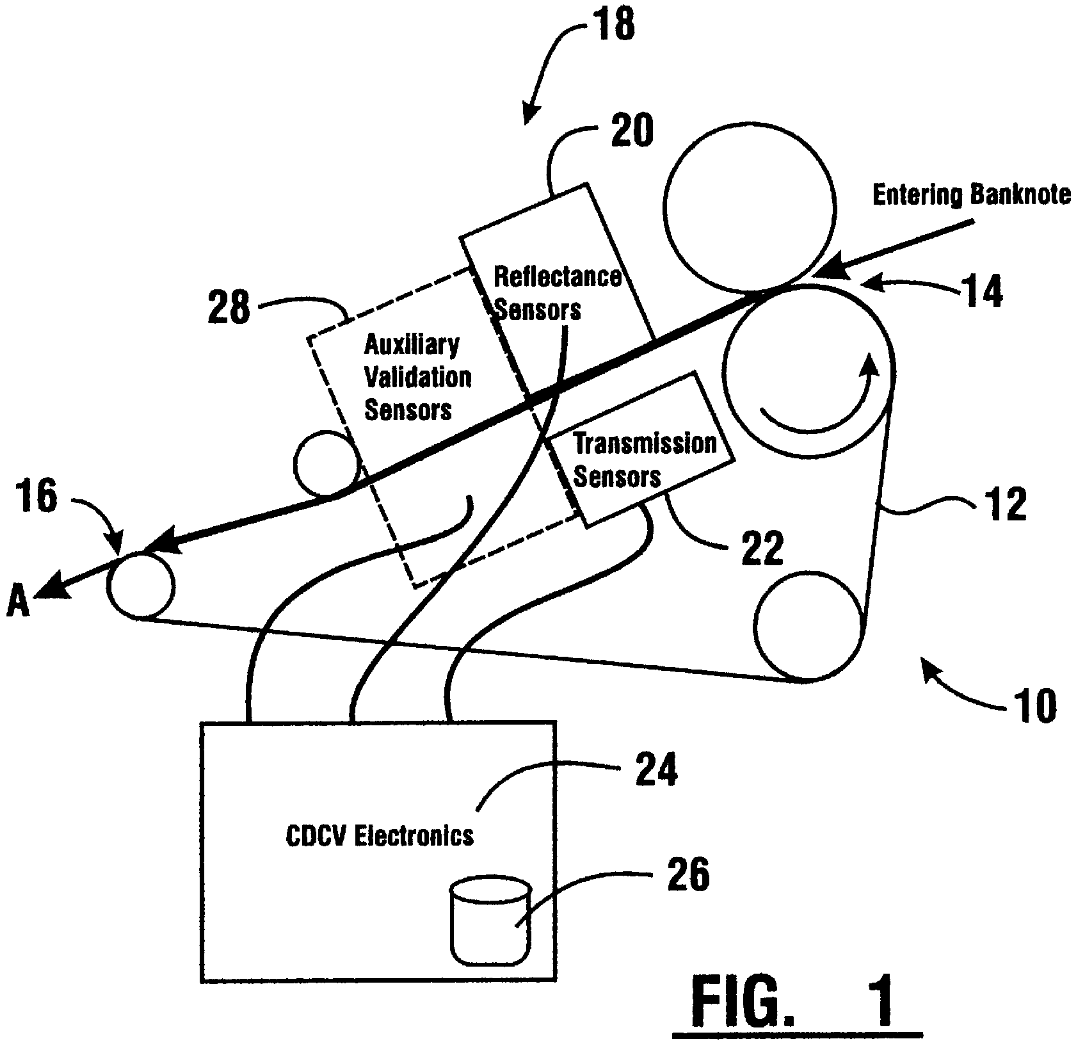
FIG. 1 is a schematic of a preferred embodiment of the apparatus for identifying notes of the present invention.

Referring now to the drawings and particularly to FIG. 1, there is shown therein one preferred embodiment of an apparatus of the present invention generally indicated 10. The apparatus includes a note transport 12. Transport 12 is preferably a belt-type transport that moves sheets such as currency notes one at a time from an entry end 14 to an exit end 16. Sheets such as notes move on the transport 12 in a note direction indicated by Arrow A.

The apparatus of the present invention also includes a plurality of spot sensing assemblies 18. The preferred form of the invention shown includes three spot sensing assemblies which are spaced from one another in a direction transverse of the note direction of note movement (see FIG. 3).

Each of the spot sensing assemblies includes a reflectance detector, schematically indicated 20. Each spot sensing assembly 18 also includes a transmission detector schematically indicated 22. As indicated in FIG. 1 the reflectance detector 20 is in operative connection with, and outputs first signals to, a control circuit schematically indicated 24. The transmission detectors 22 are also in operative connection with the control circuit 24, and the transmission detectors output second signals thereto. Control circuit 24 is also in operative connection with a data store schematically indicated 26 which holds stored values in a manner later explained.

The apparatus of the present invention may in certain embodiments also include auxiliary validation sensors schematically indicated 28. The auxiliary sensors 28 preferably detect properties of passing notes that are not detected by the spot sensing assemblies. These auxiliary sensors may include, for example, magnetic type sensors or sensors for sensing identification strips on passing notes or sheets. The auxiliary sensors 28 do not form part of the present invention and are not further discussed herein. It will be understood however, that many types of auxiliary sensors may be used in connection with the present invention and the signals output by such sensors are processed and analyzed in the control circuit 24 through appropriate electronic components.

Figure 2:
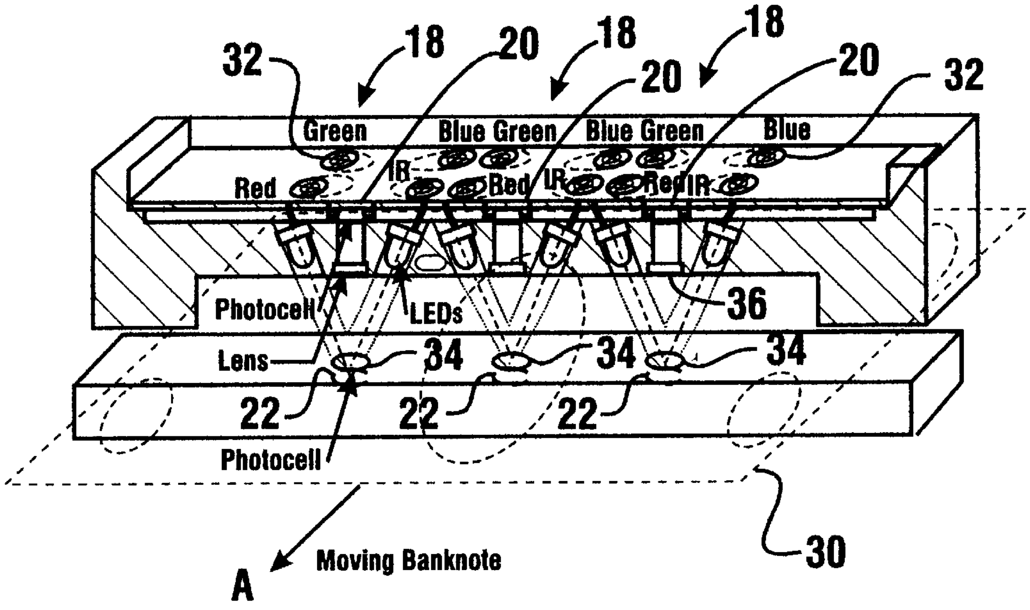
FIG. 2 is an isometric schematic view of three spot sensing assemblies sensing test spots on a moving note.
Figure 3:
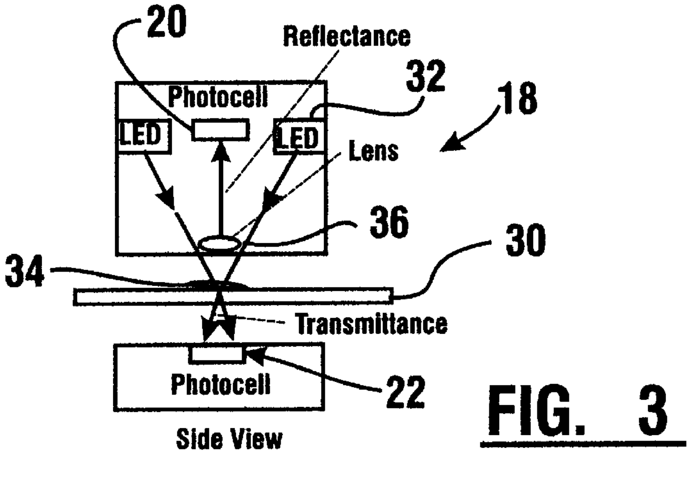
FIG. 3 is a schematic view of a spot sensing assembly.

The spot sensing assemblies 18 are shown in greater detail in FIGS. 2 and 3. Each spot sensing assembly includes a reflectance detector 20, which in the preferred form of the invention includes a photocell. The reflectance detectors 20 are positioned on a first side of a passing note 30 which is shown in phantom in FIG. 2. The transport 12 moves note 30 past the spot sensing assemblies.

Each spot sensing assembly 18 includes four emitters 32. The emitters 32 are positioned generally adjacent to, and in surrounding relation of, each reflectance detector 20. Each spot sensing assembly includes emitters with wavelengths which generally span the visible range of light and infrared. In the described embodiment each spot sensing assembly includes a blue emitter, a green emitter, a red emitter, and an infrared emitter. In the preferred form of the invention, the emitters are light emitting diodes (LEDs) which are selectively operable to produce generally monochromatic light at a particular wavelength. In other embodiments of the invention other types and wavelengths of emitters may be used.

Each emitter 32 in a spot sensing assembly is oriented so as to direct and focus radiation onto a test spot schematically indicated 34, which is shown on the adjacent surface of a passing note. In the preferred form of the invention, because there are three spot sensing assemblies, properties of the note are sampled simultaneously at three test spots 34 which are transversely spaced across the bill. As best shown in FIG. 3, radiation from the emitters 32 is reflected from each test spot 34 to the reflectance sensor 20 of the spot sensing assembly. The reflected light is passed through a lens 36 adjacent to each reflectance detector to further focus the reflected light thereon.

Radiation from the emitters 32 also passes through each test spot on the test note. The transmitted radiation passes to the transmission detector 22 of each of the spot sensing assemblies 18. In the preferred form of the invention each of the transmission detectors 22 includes a photocell. As a result, when reflectance detector 20 senses radiation from one of the emitters reflected from the test note, transmission detector 22 simultaneously senses radiation transmitted through the test note from the same emitter.

In the preferred form of the invention the control circuit 24 is operable to selectively actuate each of the emitters 32. The control circuit actuates each type emitter in each spot sensing assembly individually, so that only one emitter in a spot sensing assembly is producing radiation at any time.

In one embodiment, the control circuit 24 is operative to activate the same type emitter in each of the spot sensing assemblies 18 simultaneously. For example, all the blue emitters in each of the spot sensing assemblies are activated to produce radiation at the same time. Thereafter, all the blue emitters go off and all the green emitters in each of the spot sensing assemblies come on. Thereafter, the green emitters go off and the red emitters come on. When the red emitters go off the infrared emitters come on. The infrared emitters go off and the sequence repeats. Alternatively, the emitters may be activated in a "marquee" style so that the particular type emitter in each assembly is on for a time before it is read, and emitters of the same type are read at different times. This approach has the advantage that it enables the emitters to stabilize before being read by the controller. Of course, the sequence of emitters may be different in other embodiments.

The emitters radiate individually and in sequence rapidly such that each emitter comes on one time for each test spot 34. The test spots preferably are discrete and each of the emitters direct light onto generally the same spot on the note during one sequence despite the fact that the note is moving.

As those skilled in the art will appreciate from the foregoing description, each reflectance detector 20 produces four first signals for each test spot 34. The four first signals are produced responsive to radiation from the blue, green, red, and infrared emitters respectively. Similarly, each transmission detector 22 produces four second signals for each test spot 34. There is one second signal for the radiation transmitted through the test spot from each of the four emitters in the spot sensing assembly.

The control circuit 24 receives each of these first signals and is operative to generate a reflectance value responsive to each signal representative of the magnitude of light reflected by the note 30 from each of the emitters. Likewise, the control circuit 24 is operative to generate transmission values responsive to each of the four second signals from transmission detector 22. Each of the transmission values are representative of transmitted light through the test spot from each emitter. Because there are three spot sensing assemblies 18 spaced transversely across the note, the first circuit is operative to generate 12 reflectance values and 12 transmission values for each row of 3 test spots 34 on the note.

In one preferred form of the invention, the control circuit 24 is operative to actuate the emitters in the spot sensing assemblies very rapidly. This is done so the test spots are maintained discrete and compact. A number of test spots are preferably sensed as a note moves past the three spot sensing assemblies 18 in the transport. In one preferred form of the invention, the spot sensing assemblies are actuated so that each spot sensing assembly senses about 29 test spots on a standard U.S. currency note. This means that generally (29×3=87) test spots are sensed on the average note. Because 4 transmission and 4 reflectance values are generated per test spot (87×8=696), about 696 data values per note are gathered.

The transport 12 is preferably moved in such a speed that 15 standard U.S. currency notes per second are moved past the spot sensing assemblies. Of course, in other embodiments different numbers of test spots, data values and note speeds may be used.

A fundamental advantage of the currency identification technique of one preferred embodiment of the present invention is that the emitters produce radiation which spans the visible range of light as well as infrared. This provides signals which test the validity of the note at a number of different wavelengths in both the transmission and reflectance modes. This enables the gathering of much more data concerning the note image and material properties than prior types of note denominators and validators.

A further fundamental advantage of one preferred embodiment of the present invention is that it is capable of identifying many types of notes in different orientations. As later explained, the preferred form of the present invention does not require that the notes be precisely aligned either in the note direction, or transversely in the note path.

Figure 4:
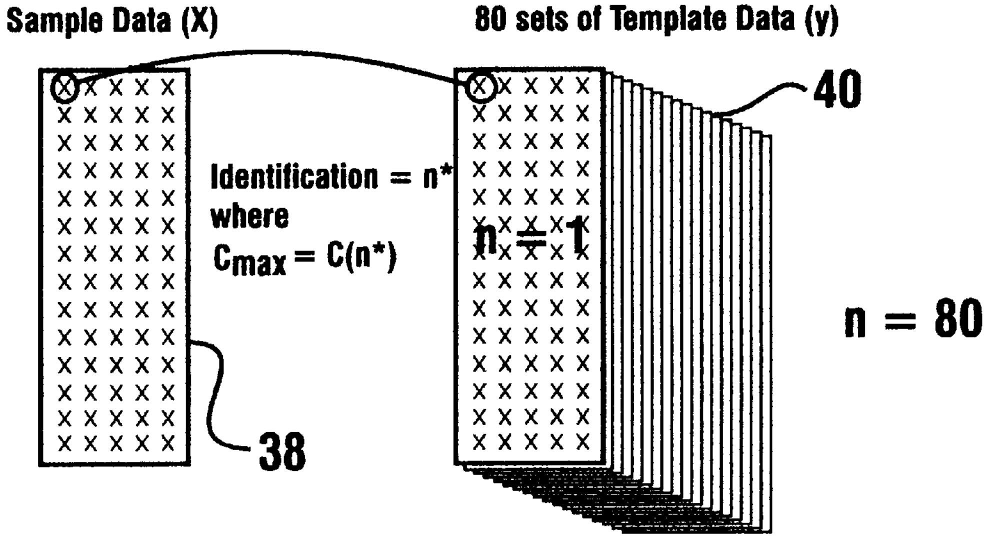
FIG. 4 is a schematic representation demonstrating how a set of sensed data values from a test note is correlated with previously stored value sets for a plurality of note denominations and orientations in the operation of the apparatus of the present invention.

As schematically represented in FIG. 4, a note which is delivered to the present invention for identification and validation may be one of many types. One preferred form of the invention is configured to identify 20 different denominations of notes. Of course, other embodiments of the invention may analyze different numbers of note denominations. However, in the preferred form of the present invention, there is no requirement that the notes delivered be oriented a particular way. Therefore, notes may be delivered face up, face down, as well as with the top of the note leading, or with the bottom of the note leading. To identify the note as a particular type, the present invention must be able to handle notes delivered in all four orientations.

In FIG. 4, a sensed value set 38, representative of a set of data sensed from the test note is shown. As previously discussed, in one preferred embodiment, this sensed value set will generally include a set that is 24 by 29. This is because each row of three test spots generates 24 values (12 reflectance and 12 transmission) and there are generally 29 rows of test spots on the note.

The right side of FIG. 4 shows stored value sets 40. In the preferred form of the invention, the stored value sets are produced by the control circuit 24. The sensed value set 38 generated from the note is compared for correlation with each of the stored value sets 40. In FIG. 4, 80 stored value sets are shown. This is representative of the 20 note denominations multiplied by four possible orientations for each note type.

As will be later explained in detail, in one preferred form of the invention, there are many more than 80 stored value sets to which the sensed value set is compared. This is because the apparatus must determine not only the particular note type (from among 80 possible note types and orientations), but must also determine the note type even though the note position may be shifted either in the direction in which the note is transported or transverse to the note direction, or may be skewed relative to the direction of transport.

Figure 5:
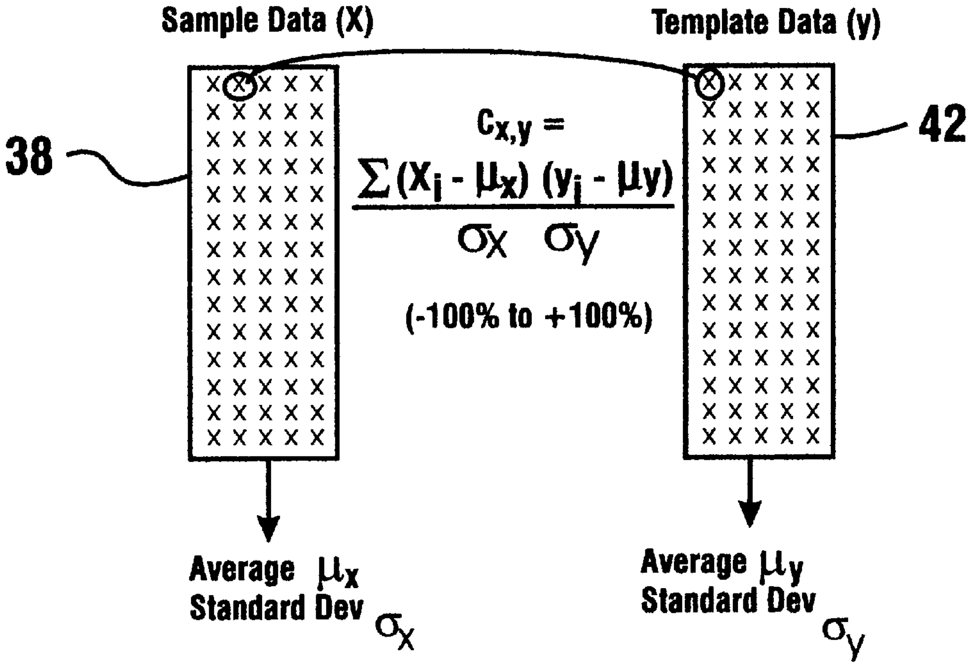
FIG. 5 is a schematic representation demonstrating the calculation of a value representative of a level of correlation between a set of sensed data values and a stored data value set for a particular note type.

The process by which one form of the control circuit calculates the values representation of the level of correlation between the sensed valued set (which is representative of the reflectance and transmission values from the sensed note) and the stored value sets, is schematically represented in FIG. 5. For purposes of the correlation calculation carried out by the control circuit 24, the sensed value set 38 is considered to be (x) data. The data values in the stored value set indicated 42 are considered to be (y) data. The level of correlation is calculated in accordance with the equation:

$$C_{xy} = \frac{\sum (x_i - \mu_x)(y_i - \mu_y)}{\sigma_x \sigma_y}$$

where:

$C_{xy}$ is the correlation coefficient.

$x_i$ is the sensed value from the sensed value set data.

$y_i$ is the corresponding value in the stored value set.

$\mu_x$ is the average of the values in the portion of the sensed value set being correlated.

$\mu_y$ is the average of the values in the corresponding portion of the stored value set being correlated.

$\sigma_x$ is the standard deviation of the sensed values in the portion of the sensed value set being correlated.

$\sigma_y$ is the standard deviation in the corresponding portion of the stored value set.

As will be appreciated, the greater the correlation coefficient the higher the level of correlation between the sensed value set and the stored value set being compared. A high value is indicative that the stored value set corresponds to the particular type test note that generates the data in the sensed value set.

Figure 6:
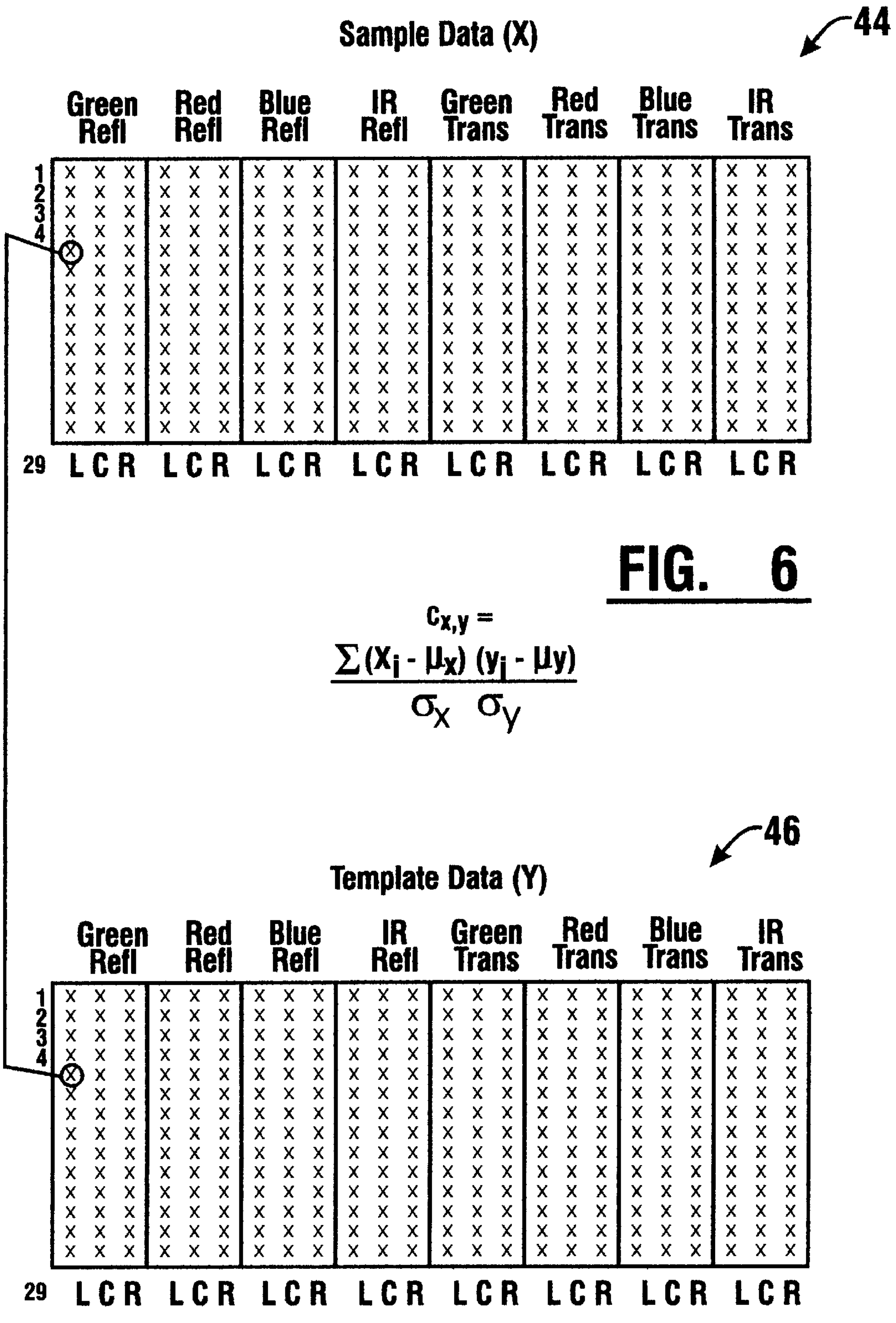
FIG. 6 is a schematic representation of data sensed from three spot sensing assemblies and the calculation of a value representative of a level of correlation between the sensed value set and a stored value set.

Turning now to FIG. 6 there is schematically shown a sensed value set 44 from a note that is moved in the note path past spot sensing assemblies 18. As shown in the upper portion of FIG. 6, sensed value set 44 is a matrix that is 24 by 29. The lower portion of FIG. 6 shows a similarly sized stored value set 46 which is generated by circuit 24 from data in the data store 26 in a manner later explained.

In one preferred form of the invention each set comprising the three columns of "x" values representing one color and mode in sensed value set 44 is checked for correlation with corresponding values in the three columns of stored value set 46. A correlation coefficient is calculated for the values in each triple column set. The correlation coefficients for each of the 8 triple column sets are then multiplied together by the control circuit to obtain an overall correlation value indicative of a level of correlation between the sensed value set and the stored value set.

In one form of the invention the correlation coefficient values for reflectance mode values are first multiplied together to obtain an overall correlation value for reflectance. Thereafter the same is done for all correlation coefficient values for transmission mode values to obtain an overall value for transmission. These overall values are then multiplied together to calculate a final value indicative of correlation of the stored value set and the test note.

Calculating the transmission and reflectance values separately has the advantage that the individual values can be analyzed individually by the control circuit in accordance with its programming. This may be preferred in some embodiments. For example, high correlation for overall reflectance but not transmission may be indicative of some quality or condition of the note that may warrant taking it out of circulation. This may include for example that the note is worn or soiled, or that it is a double note in which two genuine notes are moving in overlapped relation.

Other embodiments may combine correlation values in other ways, such as by wavelength or radiation. The combination of correlation values for analysis may differ in other embodiments depending on the notes and properties of interest. In one preferred form of the present invention, because the stored value sets generated are arranged in matrices, the device can analyze certain physical areas on notes in detail through programming of the control circuit. Thus in embodiments of the invention the manner in which sensed and stored value sets are generated and correlation values calculated may be tailored to note properties and areas of interest.

The particular type of note passing through an apparatus of the invention, is generally indicated by the stored value set having the highest overall level of correlation with the sensed value set. This stored value set corresponds to one note type, for example, a particular note denomination in a particular orientation. Once the control circuit determines the stored value set with the highest level of correlation, it then indicates the particular type of note that it has determined the passing note to be by generating a signal indicative thereof.

In some embodiments it is also desirable to point out situations where the passing note has a relatively low level of correlation with all of the possible note types. This may be indicative of a counterfeit note, a foreign note or currency that is unacceptable for reuse due to tears, dirt, wear, or extraneous markings. The control circuit 24 is operable to provide an indication not only of the identity of the note type which best correlates with the sensed value set, but also to indicate when the calculated highest level of correlation is below a set threshold which suggests a counterfeit or unacceptable note.

Alternatively, the control circuit of the apparatus of the present invention may be configured to include several set thresholds for correlation. These may correspond to notes which are suspect as counterfeit or severely damaged, and notes which merely exhibit signs of wear, age or abuse which make them unacceptable for return to circulation. This may also include notes in a double. Because one preferred form of the present invention provides data which accurately identifies notes by denomination despite wear, dirt and extraneous markings, it is possible to make such judgments concerning the quality or conditions of a note as well as to identify its type.

In some embodiments it is desirable to determine type of note by comparing the highest correlation value to a threshold. Then the average reflectance and transmission values are calculated and compared with one or more thresholds corresponding to conditions for the particular note type. This averaging and comparing may be done for radiation at a particular frequency from a single emitter or may be done for values generated from several or all of the emitters. In some embodiments reflectance and transmission values may be weighed differently, and/or combined, based on the condition being detected and approaches which achieve a desired level of sensitivity. In one embodiment, reflectance values and transmission values for each emitter frequency are averaged. These average values for the particular note (8 values) are then compared to condition thresholds stored for the particular note type. This approach may be used to increase the reliability of detecting poor quality notes by using optimized values for data thresholds which are unique to each note type. This approach may also increase flexibility in enabling many types of notes from different countries to be identified and various conditions determined in the same unit.

The present invention also provides data which may be used advantageously specifically for counterfeit detection purposes. The ability of the invention to test both transmission and reflectance across a broad spectrum of radiation, and to compare sensed data to stored values for proper notes, enables the setting of thresholds for particular wavelengths of radiation. Some wavelengths of radiation may provide data more indicative than others of counterfeit or unacceptable notes. This is particularly true in countries which have currency notes that include different color schemes for different denominations. The control circuit of the present invention may be programmed to abstract and analyze particular abstracted correlation data for this purpose.

While in the embodiment of the invention previously described, correlation coefficients are calculated for sets which correspond to 3 columns of data and these correlation coefficients are then combined, other embodiments may use sets comprised of other portions of the sensed data for purposes of calculating the correlation coefficients. These correlation coefficients may then be combined to produce a final value indicative of correlation with the stored value data. For example, correlation values may be calculated between each column or line of sensed data and stored data. These correlation values may then be combined. Alternatively, correlation values based on 12 columns associated with each mode (transmission/reflectance) may be calculated and then the 2 values combined. Alternatively, a single correlation value for all data in the sensed and stored value sets may be calculated. The approach of calculating correlation coefficients for 3 columns of data and then combining them as described has been found to work well for U.S. currency. However, for other types of notes or documents, or for other forms of sensing hardware, other approaches to calculating correlation coefficients and then combining them, may also be found to work well in indicating the identity of the test note or document.

Referring again to FIG. 6, it should be noted that in the embodiment of the invention shown that generally the first four rows of sensed data and generally the last three rows of such data, are not correlated with the stored value sets when the bill is transversely aligned in the note path. Generally, the calculation of the level of correlation is made between sensed value sets and stored value sets comprising 22 rows and 24 columns. As later explained, the first four rows of data sensed from the note and the last at least three rows, are generally used to calculate whether the note is skewed in the transverse direction of the bill path as well as to confirm that the note is the proper length. If the note is skewed the control circuit generates stored value sets by selecting values from the data store which are correspondingly transposed to correspond to the calculated angle of skew. Further, as can be appreciated by those skilled in the art, if a note is "longer" than a proper note, such that it produces data for more test spots than it should, it is identified as a suspect or counterfeit note by the control circuit and is rejected or treated accordingly.

In one preferred embodiment of the invention, notes passing the spot sensing assemblies on the transport need not be aligned either in the note direction or in a transverse direction to be identified. To achieve this, the data store includes data for all of the identifiable note types at a much closer spacing than the spacing between test spots detected by the spot sensing assemblies as a note passes. In one preferred form of the invention, the data is collected and stored for increments that are one-fourth the spacing between the test spots on a note passing in the transport. Of course, in other embodiments of the invention other increments may be used.

Figure 7:
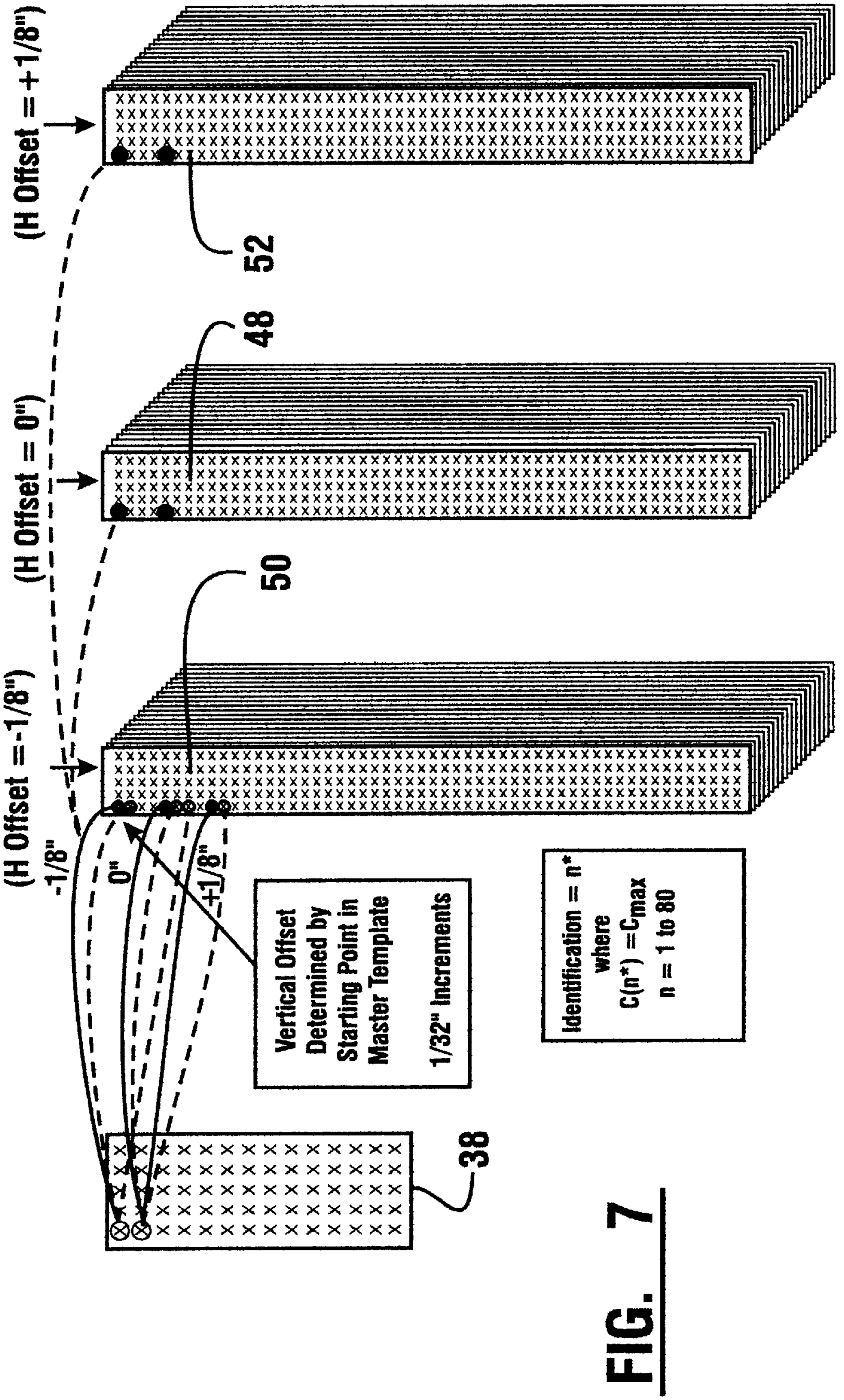
FIG. 7 is a schematic representation of values stored in a data store of the preferred embodiment of the invention, and how this data is correlated with a sensed value set.

In FIG. 7 a sensed value set 38 is schematically represented. A first template 48 is representative of a particular type of note denomination that passes in centered relation relative to the 3 spot sensing assemblies in the transport. As a result, it is indicated in FIG. 7 as having a "0" offset. The values shown in first template 48 are the 24 transmission and reflectance values for a note of a particular type at increments one-fourth the distance between the test spots on a passing note. Thus, in the preferred embodiment, first template 48 would be a matrix of 24 by (29×4) 116 values.

Stored value sets for comparison to a sensed value set are derived from template 48 by the control circuit by taking the values in every fourth line from the template. In other words, the data in lines 1, 5, 9, 13, and so on, correspond to a note in a particular position relative to the direction a note moves in the transport. Similarly, lines 2, 6, 10, 14, and so on correspond to the same type of note in another position relative to the note direction.

From the template 48, the control circuit generates stored value sets corresponding to the particular note type to which template 48 corresponds in varied positions relative to the note transport direction.

In FIG. 7, second template 50 corresponds to the same note type as note 48. Second template 50, however, has reflectance and transmission values for test spots on the note offset a transverse increment from the test spots which produced the values in first template 48. By taking every fourth line of values from template 50 the control circuit generates stored value sets for the particular type of note, transversely offset from the centered position and in various positions relative to the direction of note transport.

Third template 52 shown in FIG. 7 corresponds to the same type of note as templates 48 and 50. Template 52 contains values corresponding to test spots on the note shifted transversely from the zero offset position in an opposed direction from template 50. Third template 52 is also a matrix of 24 by 116 values. Stored value sets are produced therefrom by the control circuit by abstracting every fourth line of values.

In one preferred embodiment of the invention, templates are provided for test spots at several transversely offset positions. This enables notes to be disposed from the centerline of the note path, as well to have a leading edge that is not aligned with any reference, and still be identified.

The process of inputting the data necessary to produce the templates is accomplished in one preferred embodiment during a set up mode of the apparatus. In the set up mode, stored value data is generated by positioning a note of each type in the transport. Data is gathered by each spot sensing assembly from 116 lines of test spots instead of the 29 lines which is the usual number for a sensed note. This can be accomplished by static positioning of the note or, alternatively, by moving the note at a speed which enables the spot sensing assemblies to be sequenced sufficient times to gather the data for storage in the data store.

During the set up mode, the notes are sensed while centered in the transport path as well as disposed transversely from the centered or "zero offset" position, so that the templates for notes that are transversely offset in increments are generated and stored. The ability to set up the device by using actual currency and passing it through the transport enables set up of forms of the apparatus in a rapid and reliable fashion. This is desirable where this data must be gathered for twenty notes, each of which has four orientations and several offset positions.

In one embodiment of the invention, templates are produced for four offset positions in each transverse direction from the zero offset position. These templates are offset in increments of one-eighth of an inch. This means that a note passing through the transport may be positioned within one half inch in either transverse direction of the zero offset position and still be accurately identified.

In other embodiments of the invention it is feasible to gather and/or compute the stored values experimentally and store them in templates in the data store. Alternatively, such templates may be produced in a separate machine and then loaded into the data store of the apparatus. Provided the data is accurately gathered, the apparatus will properly indicate the type of note sensed.

Figure 12:
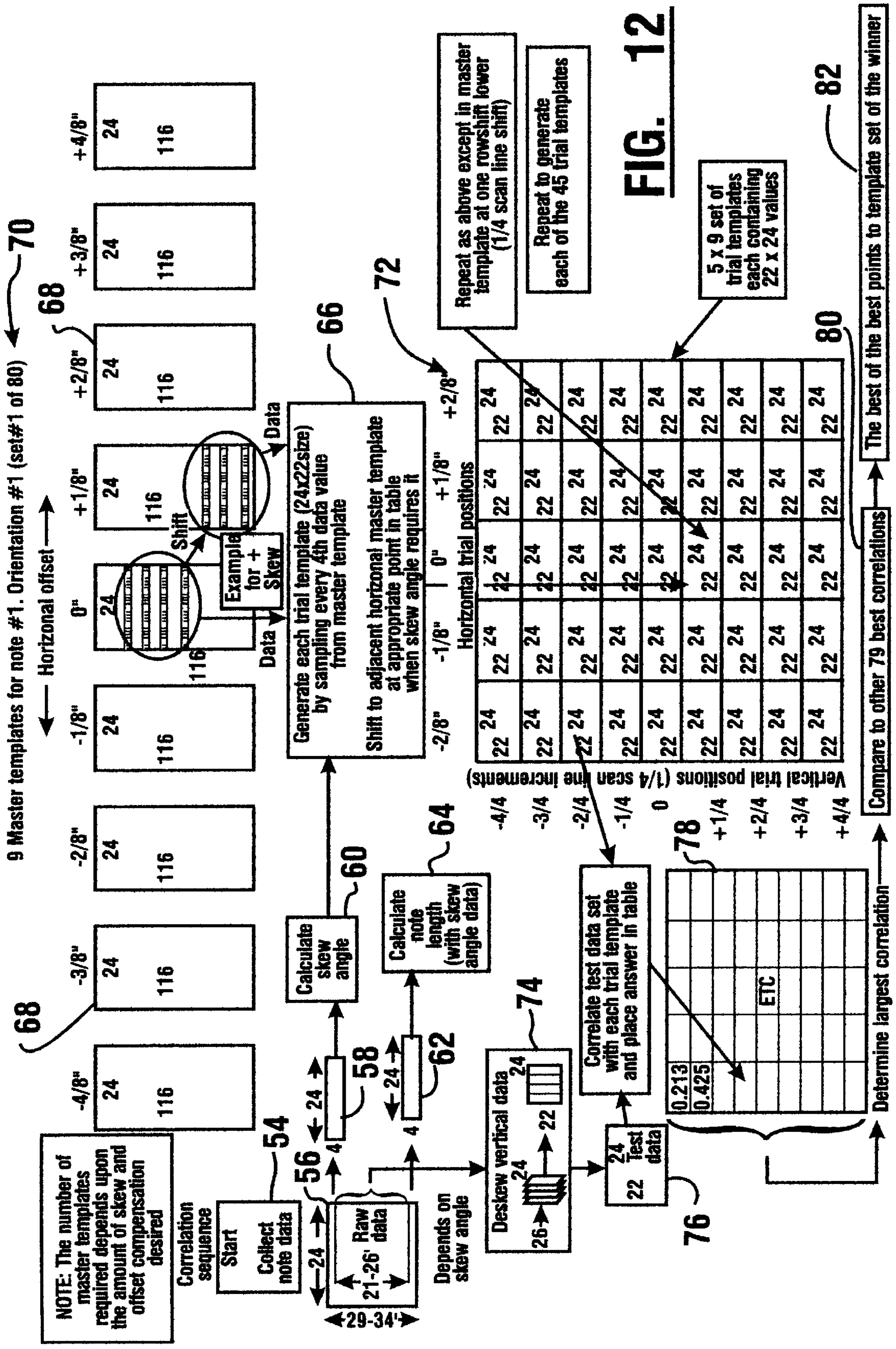
FIG. 12 is a schematic representation showing the steps in the correlation sequence carried out in the preferred embodiment of the present invention.

The process by which the apparatus of the present invention calculates a level of correlation and determines the identity of a note is schematically represented in FIG. 12. It should be understood that in the operation of one embodiment of apparatus 10 the control circuit 24 actuates the emitters of each of the spot sensing assemblies 18 in the sequence on a continuing basis. A note can arrive at any point during the sequence. As the note moves in the note path adjacent to and then passes the three spot sensing assemblies 18, the control circuit gathers the data at a step 54. The data gathered is arranged in memory as a matrix of values that is generally 24 by 29. This raw data is represented by matrix 56. Matrix 56 may actually contain more values if the note is skewed. However, for purposes of this initial example, a 24 by 29 matrix will be assumed which corresponds with a non-skewed note.

As represented by 4 by 24 submatrix 58, the first four rows of data from the note are used by the control circuit to calculate a skew angle at a step 60 in a manner hereinafter discussed. Further, as represented by the 4 by 24 submatrix 62, control circuit 24 is operable to calculate the note length at a step 64. In doing this, the control circuit considers the skew angle, because the spot sensing assemblies will sense more than 29 rows of test spots on a note if the note is skewed. At step 64 the length of the note is determined based on the number of test spots from which data is received, and the skew angle. The note length is compared to a stored value indicative of the number of test spots for a standard note length, and if the note is "too long" or "too short" control circuit 24 generates a signal indicative of the condition sensed.

Assuming for purposes of this example that the note is the correct length and transversely aligned with respect to the note path, the control circuit 24 is operative at a step 66 to generate stored value sets. The stored value sets are generated from templates 68. The nine templates 68 shown are each a matrix of 24 columns by 116 rows. The nine templates 68 comprise a master template 70 which corresponds to a note type (one note denomination in a particular orientation). Each of the nine templates 68 correspond to the note type in each of nine transverse positions in the note path. The 116 rows of data in each template 68 represent the transmission and reflectance values in increments one-fourth the distance between test spots on a sensed note that is passed through the transport.

In the embodiment of the invention described, the nine 24 by 116 templates 68 comprise the master template 70 which includes all the stored values corresponding to one note type. Because the described form of the invention is configured to identify twenty notes in four orientations, there are eighty master templates in the data store in this preferred embodiment. Each of the master templates is comprised of nine templates, like templates 68. This means that in this preferred embodiment the data store holds (80×9=720) templates, each template having (24×116–2784) data values, for a total of (720×2784=2,004,480) stored values in the data store. Of course in other embodiments other template arrangements may be used.

The control circuit 24 is operative in the example shown to produce forty-five stored value sets 72 from the templates 68 in each master template 70. These forty-five stored value sets are shown in a table in FIG. 12. These stored value sets 72 are generated by the control circuit by taking every fourth line from each of the templates 68. The control circuit preferably does this starting with the sixteenth line in each of the templates 68. This is done because, as previously discussed, the first four rows of data taken from the note are used to calculate skew angle, and are generally not used in generating the stored value sets 72 if the note is not skewed. Forty-five stored value sets 72 are generated for each of the eighty templates 70.

As can be appreciated from the foregoing discussion, with the first four rows of test spots being discarded, the first row of test spots on the note from which the data would be used for correlation purposes in this example would be the fifth row of test spots. This corresponds to the (4×5) twentieth line in each template 68. Thus the control circuit takes the twentieth line and every fourth line thereafter until 22 rows of data are read to generate a 22 by 24 stored value set 72. Stored value sets produced in this manner correspond to the "zero vertical position" in the table in FIG. 12.

However, because the note sensed may be shifted forward in the note path from the zero position, the control circuit 24 is operative to generate stored value sets 72 that are likewise shifted forward in the note direction. This is done by starting with the nineteenth line in each template 78 and taking every fourth line thereafter until 22 values are gathered. This corresponds a shift forward one increment. Stored value sets generated in this manner are the –¼ stored value sets 72 shown in FIG. 12.

Likewise, stored value sets shifted two increments forward are generated starting with the eighteenth line of data in each of the templates 68 and taking every fourth line thereafter. This corresponds to the –2/4 stored value sets 72 shown in the table in FIG. 12.

As can be appreciated, stored value sets are also generated starting with the seventeenth line in each template 68. These correspond to the –¾ stored value sets 72. Stored value sets starting with the sixteenth line correspond to the –4/4 stored value sets 72 in the table in FIG. 12.

The note may also be shifted rearwards from the "zero vertical position". As a result, stored value sets 72 are produced starting with the twenty-first, twenty-second, twenty-third, and twenty-fourth values in each of the templates 68. These correspond to the +¼, +2/4, +¾, and +4/4 vertical position stored value sets respectively shown in FIG. 12.

Stored value sets 72 are further generated for transverse offset positions. As shown in FIG. 12 stored value sets are produced for transverse offset positions of –⅛", –2/8", +⅛" and +2/8". Thus, the 45 stored value sets 72 represent reflectance and transmission values for one note type shifted forward and backwards in the direction the note moves in the transport, as well as in both transverse directions.

While the master templates 70 consist of nine transverse sub-templates 68, in one preferred form of the invention, stored value sets 72 are only produced for five transverse positions of the note, rather than nine. This is because the transport of the described embodiment and the manner in which the notes are delivered, generally maintain the notes within a quarter inch of the zero offset position. For this reason in the described embodiment, it is not necessary to produce additional stored value sets. However, in alternative embodiments where the transverse position of the note may be further disposed from the zero offset position, additional stored value sets may be generated by the control circuit and used for correlation with the sensed value sets.

Referring again to FIG. 12, the matrix of raw values 56 from a test note that is sensed undergoes a vertical de-skewing step 74 performed by the control circuit 24 when the note is sensed as skewed, as later explained. When the note is not skewed as in this example, step 74 has no effect on the raw data. In the present example, a sensed value set 76 which is a 24 by 22 matrix is produced by the control circuit 24 directly from the raw data.

The control circuit 24 is then operative to calculate the level of correlation between the sensed value set 76 and each of the stored value sets 72 in the manner discussed with reference to FIG. 6. Each of the correlation values is calculated and temporarily stored by the control circuit, which storage is represented by table 78. From all the correlation values calculated for each master template, one value will generally be the highest. Of course, there are eighty master templates and the control circuit is operative to find the highest level of correlation among the forty-five values for each of the 80 master templates. This is represented by a step 80 in FIG. 12. The control circuit is then operative at a step 82 to provide an indication of the identity of the note type that produced the highest correlation value and therefore most closely correlates with the sensed value set from the note that passed through the apparatus.

As previously discussed, embodiments of the invention also have stored in connection with the control circuit, data corresponding to a threshold value which the highest level of correlation value calculated must exceed before a note is considered genuine. This threshold value may be set for each note type or may be the same for several note types. The threshold may be determined through experimentation and a corresponding value stored in the data store, or calculated from stored data and dynamic factors. If the highest level of correlation for all the stored value sets does not exceed this threshold level, then the note is suspect and potentially a counterfeit. In some embodiments, for certain note types there are stored thresholds for average reflectance and transmission values for particular types of radiation. These thresholds are compared to sensed values and used for determining note conditions, such as note quality and genuineness. Suspect notes may be returned to a customer or held within the apparatus in a designated location. This is done by using a divert mechanism schematically indicated 17 in FIG. 1 that transports or otherwise directs notes to the designated location.

Alternative embodiments including aspects of the invention may be used to segregate notes that are considered in good condition from notes that exhibit wear, abuse or soiled conditions. This may be accomplished by having stored in connection with the control circuit 24 data corresponding to a further threshold value for correlation which is above the threshold for note genuineness, but below that for notes in a desired condition. The threshold may be based on fixed and or dynamic data. Such an intermediate threshold may be used for purposes of segregating bank notes that, while still good, are sufficiently worn or soiled such that they should be removed from circulation.

Alternatively, such an intermediate threshold may be indicative of a double note which should be diverted to storage or transported for further processing to separate the notes. Embodiments of the invention may also have stored threshold values corresponding to transmission and reflectance properties for the particular type note. In some embodiments these threshold values may correspond to averages of reflectance and transmission values. Comparison of such average values for the note detected to the threshold values for the particular note type, identifies notes having the note conditions corresponding to the thresholds.

Alternative embodiments of the invention may be particularly adapted for determining the note condition with or without making a determination of the note type. In such embodiments one or several emitters direct radiation at one or more test spots on a note. The magnitudes of the reflected radiation and the transmitted radiation through the test spot are sensed with respective sensors positioned on opposite sides of the note in the note path. The signals corresponding to the reflectance and transmission values are processed together by appropriate circuitry to provide one or more values. This calculated value may then be compared to one or more threshold values which correspond to values stored in the data store. The stored values correspond to conditions of interest for which the analysis is conducted.

By way of example, a condition for which sensing may be conducted is the existence of a double note. In the case of a U.S. note of a particular type, a double condition is determined from the magnitudes of the reflectance and transmission values through one or more test spots. In the case of infrared radiation which is used for purposes of this example. The magnitude of the reflected radiation is directly related to the thickness of the note. Thus in the case of the double note the magnitude of the reflectance signal will be greater than in the case of the single note. The magnitude of the radiation transmitted through the note is inversely related to the thickness of the note. As a result the magnitude of the transmitted radiation will be greater for a single note than a double note.

The darkness of the surface of note, which in this example is U.S. currency, affects both the magnitudes of the radiation reflected from and the radiation transmitted through a note. Specifically, darkness which may be due to color, density of printing in particular areas or a soiled condition of the note, reduces the magnitude of both the transmitted and reflected radiation in the infrared range. Likewise, wearing of the note which reduces thickness and generally results in a lessening of color, has an opposite effect in generally increasing the magnitude of both reflectance and transmission values.

In this example the conditions which produce variations in transmittance and reflectance properties may be used to establish the threshold representative of a double condition or other conditions. The circuitry employed is operative to combine the transmittance and reflectance signals, and to provide compensation for changes in color and pattern density on the face of the note from which radiation is reflected. Because a reduction in reflectance will correspond to a drop in transmittance without a change in thickness, a resulting value corresponding to the combined signal is less affected by the color and pattern on the face of the note and more sensitive to note thickness. The combined value may then be compared to one or more thresholds corresponding to a double note condition. Alternatively, the circuitry may be operative to adjust the threshold based on reflectance and/or transmission signals.

In alternative embodiments other conditions which produce variations in transmittance and reflectance properties may be used to establish thresholds corresponding to various conditions. Circuitry employed in such embodiments may determine single or multiple note conditions, as well as the existence of other conditions. This is accomplished by including in the calculation of values corresponding to the note properties and/or in comparing values corresponding to properties to thresholds that are indicative of conditions, the signals which correspond to both the magnitude of radiation reflectance from, and transmission through, test spots. In making such determinations of the existence of conditions, the transmission and reflectance values sensed may be weighted differently when combined or otherwise processed for purposes of determining a resultant value for comparison to threshold values. The approach used for processing and weighing the sensed transmission and reflectance values depends on the properties of the note types involved and the conditions that are to be determined. Threshold values may correspond to stored data values determined through experimentation and/or combinations involving stored and dynamically sensed values.

It should be appreciated that alternative embodiments that make determinations of note conditions may due so using spot sensing assemblies similar to spot sensing assemblies 18. Other embodiments may have fewer radiation emitters such as the single infrared type emitter discussed in the foregoing example. Likewise, other embodiments may have different or other types of radiation emitters and sensors. Embodiments may also be specifically adapted to determine at least one note condition without determining note type. Some embodiments may include emitters and sensors which sense transmission and reflectance properties over test spots that are either longitudinally and/or transversely elongated. These may include test spots that are elongated over substantial portions or even the entire width or length of a note. Other alternative embodiments may sense conditions only in selected regions of notes where the properties of reflectance, transmission or both, are particularly indicative of conditions to be determined. The circuitry of alternative embodiments may be operative to sum or average transmission and reflectance values as well as to apply weighting factors to such values which result from a combination thereof over one or more test spots. Finally, alternative embodiments may operate in combination with the note type determining sensors and circuitry as previously described, or may comprise separate sensors and circuitry.

A further advantage of embodiments employing aspects of the present invention is that it may provide an indication of note type that includes note orientation. This enables the present invention to be coupled with mechanisms which reorient the note and segregate notes of different denominations. This enables the notes to be collected for bundling or for dispense to a user of the machine in which the apparatus of the present invention is installed.

Embodiments of the present invention also provide capabilities for detecting counterfeit notes. This is achieved because the available data may be selectively processed by the control circuit in ways that are intended to assist in the detection of counterfeit notes. If, for example, it is known that counterfeit currency for a particular country tends to deviate significantly from actual currency either in reflection or transmission of a particular wavelength of radiation, or in a particular region of a note, the level of correlation for this particular wavelength or region of the note may be analyzed by the control circuit individually. Notes which exhibit the properties of a counterfeit may then be identified as suspect even through the overall level of correlation may be marginally acceptable. The particular properties which may distinguish a counterfeit note from a genuine note will depend on a particular currency or other document involved and its properties.

Figure 8:
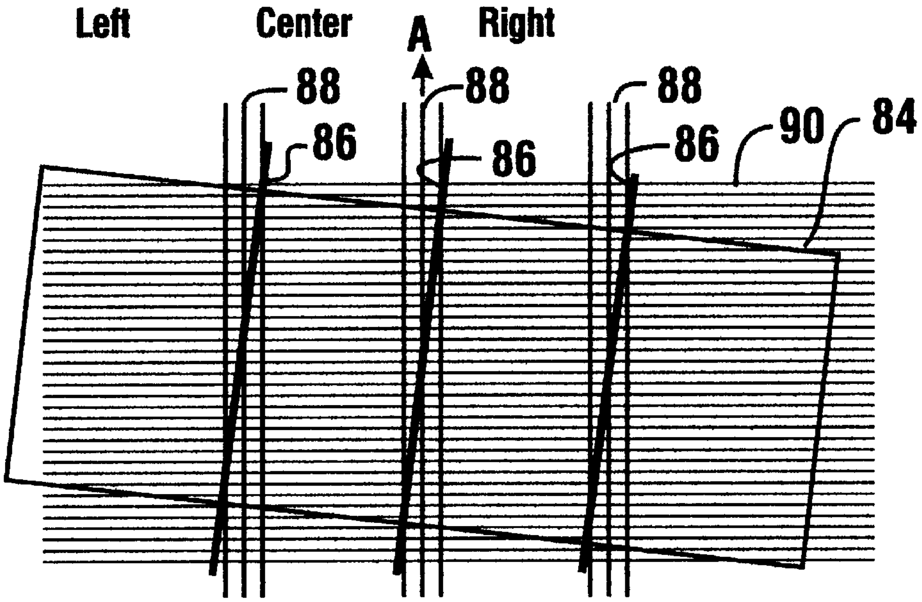
FIG. 8 is a schematic view of a note passing through the apparatus of the present invention in a skewed condition.

A further advantage of certain preferred embodiments of the present invention is that notes passing through the apparatus need not be aligned transversely in the note path. Rather, the notes may be skewed such that one of the transverse sides is ahead of the other. An example of a note 84 that is skewed relative to the note path is shown schematically in FIG. 8. Note 84 is shown with its left side leading. Lines 86 which are superimposed on the note in FIG. 8 show the lines or grid of test spots that would be sampled if the note were aligned in the note path. Lines 88 represent the lines of test spots on the skewed note that are tested by the spot sensing assemblies. Superimposed lines 90 represent where the spot sensing assemblies sense data. Therefore, the intersections of lines 90 and 88 represent a grid of locations where data is gathered by the spot sensing assemblies as the note 84 passes.

Figure 9:
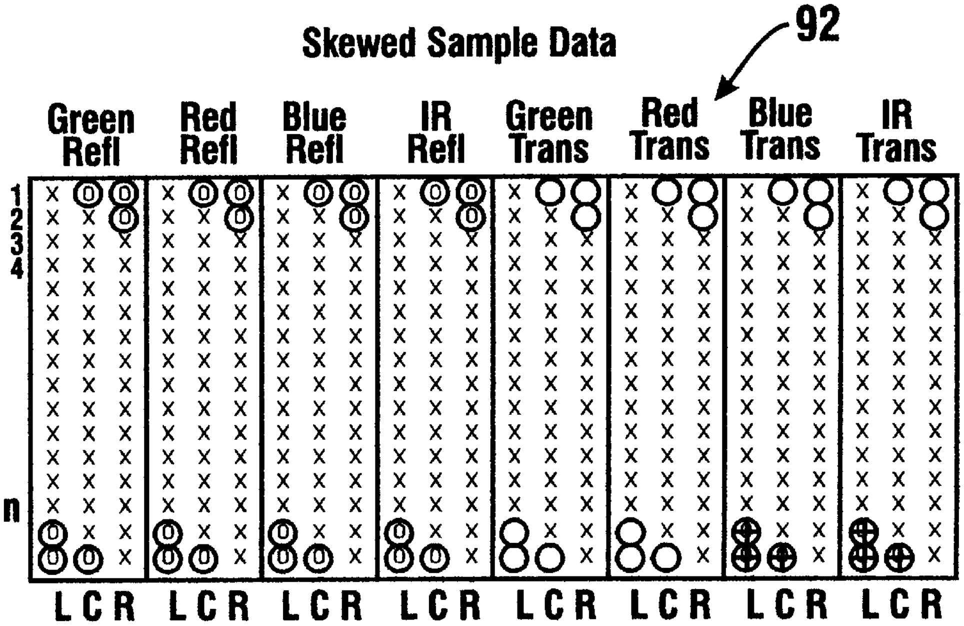
FIG. 9 is a schematic representation of data generated by the circuit of the invention responsive to signals from the spot sensing assemblies for the skewed note shown in FIG. 8.

A sensed value set 92 shown in FIG. 9 shows the matrix of raw data that is generated as note 84 passes the spot sensing assemblies. The spot sensing assembly that is positioned toward the left in FIG. 8 begins sensing data from the note before the spot sensing assembly in the center. Further, the spot sensing assembly in the center begins sensing data before the spot sensing assembly on the right. The spot sensing assemblies that do not sense the note sense a near zero reflectance value and a large transmission value. Similarly, at the trailing portion of the note which is shown by the bottom of the raw sensed value set 92, the spot sensing assemblies stop sensing the note at different times in a manner that is essentially a mirror image of the condition at the leading edge of the note. As can be appreciated from FIG. 8, because of the skewed character of the note, the spot sensing assemblies sense data for more than 29 of the transverse lines 90. It will be recalled that 29 rows of test spots were sensed in the prior example for a non-skewed note.

To analyze this data, the control circuit 24 of the apparatus of the described embodiment of the present invention is operable to modify the raw sensed value set data 92 represented in FIG. 9 so that it is similar to other sensed value sets for transversely aligned notes. The control circuit 24 of the invention is further operative to produce stored value sets which account for the angle of skew of the note.

When a note is skewed, the control circuit 24 is first operative to modify the raw sensed value set 92 by transposing the data to eliminate the data points near the leading edge that represent the absence of a note. This involves shifting the values on the right for each type of emitter as shown in FIG. 9, upwardly so that a sensed value set is created in which the sensed note data is present in each position in the 29 rows. Such a modified sensed value set is indicated 94 in FIG. 10.

As shown in FIG. 10, by shifting the raw values, a sensed value set which is a matrix of 24 by 29 sensed values is produced. Although the data was gathered from more than 29 of the transverse lines 90 when the bill was sensed, the modified sensed value set 94 "squares up" the sensed data so that it is a similar sensed value set to a transversely aligned note.

Such "squared up" data is usable by the control circuit for purposes of checking to see if the note sensed is the proper length. If after "squaring up" the raw data the data does not correspond to the length of a proper note, an appropriate indication of a suspect note is given.

As can be appreciated from FIG. 8, the modification of raw sensed value set 92 to create sensed value set 94 does not result in a matrix of values that can be readily correlated with templates for notes that are aligned in the note path. This is because the test spots on skewed note 84 progressively move closer to the right edge of the note as the note passes. The rate at which the test spots on the note migrate toward the right is a function of the skew angle. To enable correlation of the modified sensed value set 94 with stored value sets, the control circuit 24 is operable to generate stored value sets for correlation that account for the angle of skew. This is graphically represented in FIG. 11.

FIG. 11 shows a modified sensed value set schematically indicated 96. This modified sensed value set 96 for purposes of this example can be envisioned as corresponding to a note like that in FIG. 8 where the note is skewed such that the left side in the frame of reference leads the right side. The control circuit is operable based on the calculated angle of skew of the note to take values from different sub-templates 68 in the master template 70 as graphically represented in FIG. 12.

As shown on the right in FIG. 11, the values in columns 98, 100, and 102 represent the templates similar to sub-templates 68 for a 0" horizontal offset, +⅛" horizontal offset, and 2/8" horizontal offset respectively as shown in FIG. 12. To generate a stored value set for correlation with modified sensed value set 96, the control circuit 24 is operative to select a series of values from the 0" offset template represented by column 98. The control circuit is then operative to "jump" so as to begin selecting values from column 100 which corresponds to the template 68 for the same note type transposed +⅛" from the 0" offset position. Further, after taking several values from column 100 the control circuit is operative to begin selecting values from column 102 which is representative of the template for the same note type disposed +2/8" from the 0" offset position.

The point where the control circuit 24 begins selecting values from the different templates is determined by the angle of skew. Stored value sets are generated for all positions of the note disposed within one-fourth inch of the zero reference in the note path in a similar manner.

As can be appreciated from the graphic representation in FIG. 11, to generate stored value sets that encompass the possible positions for a skewed note, the control circuit must abstract values from templates 68 for notes that are disposed more than one-fourth inch away from the zero offset position. As can now be appreciated from FIG. 12, this is why there are additional transverse offset templates 68 in each master template 70, even though the note is generally confined to an area plus or minus one-fourth inch from the zero offset position in the note path.

Figure 14:
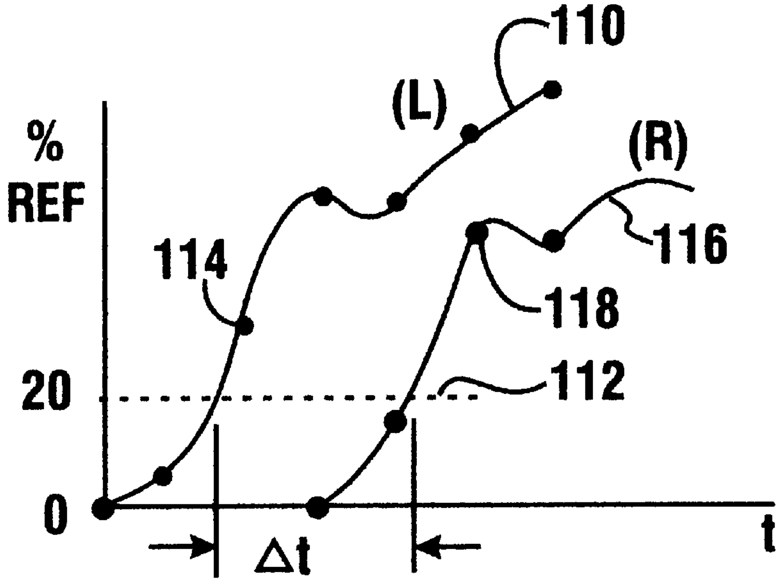
FIG. 14 is a graphical representation of reflectance signals obtained from transversely disposed spot sensing assemblies for a skewed note, which signals are used by the control circuit to determine an angle of skew.
Figure 15:
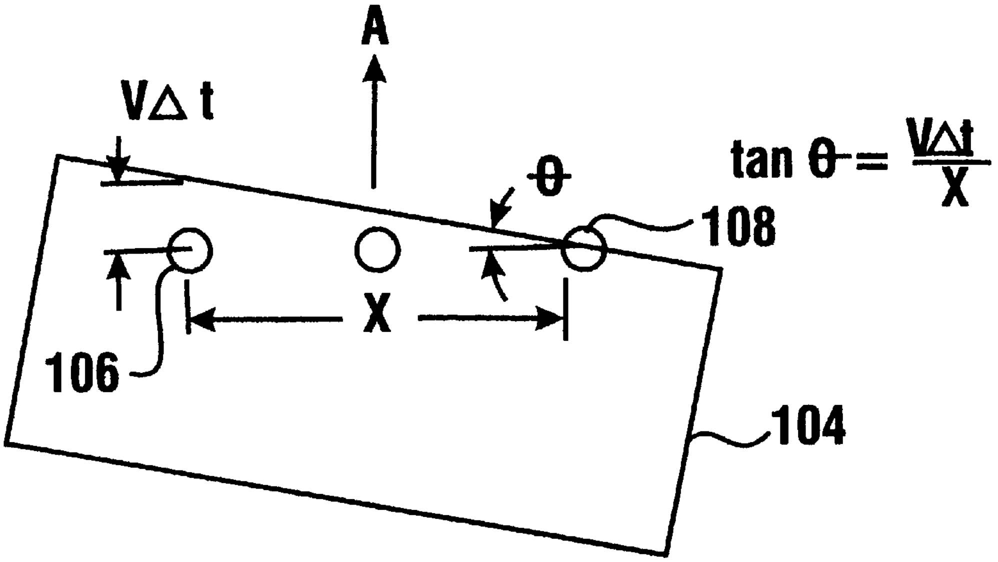
FIG. 15 is a schematic view of a skewed note and three transversely disposed spot sensing assemblies which correspond to the data graphically shown in FIG. 14.

The calculation of the skew angle which determines how the control circuit selects or abstracts values from the various templates to produce the stored value sets, is explained with reference to FIGS. 14 and 15. FIG. 15 shows a note 104 which is skewed in a manner similar to note 84 in FIG. 8. Note 104 has a left side leading a right side in a direction of note travel indicated by Arrow A. A spot sensing assembly 106 is positioned to the left as shown in FIG. 15. A spot sensing assembly 108 is positioned to the right as shown in FIG. 16. Both of the spot sensing assemblies are the same and similar to spot sensing assemblies 18 previously discussed.

Line 110 in FIG. 15 is representative of the reflectance values for a first emitter type to have produced radiation which is reflected from note 104 in an amount above a set threshold 112. This threshold is indicated as 20 percent in FIG. 14 which has been found through experimentation to be an acceptable value for this purpose when using U.S. currency notes. Of course other threshold values may be used. Data points 114 are representative of the actual reflectance values for the particular type emitter in spot sensing assembly 106 which was the first of the emitters to produce a reflectance value above the threshold. Line 110 is produced by a curve fitting process carried out by control circuit 24 using actual data points 1 14. This is done through execution of known curve fitting algorithms.

Line 116 is fitted by the control circuit to data points 118. Data points 118 are representative of the actual reflectance values from the emitter type in spot sensing assembly 108 that corresponds to the emitter that produced data points 114 in spot sensing assembly 106. By comparing the times at which the lines 110 and 116 each crossed the threshold 112, the skew angle of the note may be calculated. This difference in time in which reflectance values for the same emitter type in each of the spot sensing assemblies crossed the threshold is represented by the quantity Δt in FIG. 14.

The distance between spot sensing assemblies 106 and 108 is a known fixed quantity. Similarly the speed at which the note moves on the note transport is also known. As shown in FIG. 15 the angle of skew θ can be calculated by the following equation:

$$\tan\theta = \frac{v\Delta t}{x}$$

where:

θ is the angle of skew;

v is the velocity of the note in the note direction;

Δt is the difference in time between when the first emitter in a first spot sensing assembly senses the property of the note crossing the threshold, and when the corresponding emitter in the furthest disposed spot sensing assembly senses the property for that assembly crossing the threshold;

x is the distance between the spot sensing assemblies 106, 108 for which the time difference is evaluated.

As can be appreciated from the foregoing discussion, the angle of skew determines the points at which the control circuit begins selecting values from the templates to produce the stored value sets for comparison to the modified sensed value set. Of course, the angle of skew may be in either direction which necessitates that the control circuit be enabled to abstract values from templates 68 progressively in either transverse offset direction.

Referring again to FIG. 12 which shows the correlation sequence, step 74 is the de-skewing step in which the raw sensed value set from the spot sensing assemblies like set 92 in FIG. 9 is "squared up" to produce a modified sensed value set similar to set 94 in FIG. 10. When the data is skewed this step is done to produce the sensed value set 76 in FIG. 12 for purposes of correlation.

In step 66 the stored value sets are produced by the control circuit by abstracting data from the templates 68 in each master template 70, responsive to the skew angle detected. Thus, in the example represented in FIG. 12, values are abstracted from the 0" offset template 68 and the +⅛" offset template 68 to generate the stored value set 72 in the table of stored value sets the 0 vertical and 0" horizontal offset position.

As will be appreciated from the prior discussion, for the stored value sets 72 shown in the table above the 0 position, shifts between the two adjacent templates 68 occur one line of data higher with each −¼ step upward in the table of stored value sets. Similarly, the shift between the templates would occur one data line downward for each +¼ increment below the 0 vertical offset position in the table of stored value sets.

For example, to generate the stored value set 72 shown in the table having a 0 vertical offset and a horizontal offset position of −⅛", values on the corresponding lines highlighted in FIG. 12 in the 0" horizontal offset template, would instead be taken from the template having a horizontal offset of −⅛". Likewise, the lines shown highlighted in FIG. 12 in the +⅛" horizontal offset template, would instead be taken from the 0" horizontal offset template. Similarly, lines of data would be abstracted from these two templates by the control circuit 24 one data line upward from the values used to produce the 0, −⅛" stored value set, to generate the stored value set shown in the table at −¼", −⅛". Abstracting values from the templates two data lines upward from the values used to generate the 0, −⅛" stored value set, provides the −²⁄₄, −⅛ stored value set and so on.

Similarly abstracting values from the two templates used to produce the 0, −⅛" stored value set 72, provides the +¼, −⅛"; +²⁄₄, −⅛"; +¾, −⅛" and +⁴⁄₄, −⅛" stored value sets. This is done by abstracting values successively one data line lower than those abstracted to produce the prior stored value set.

Likewise, to produce the stored value set 72 in the 0 vertical offset, −²⁄₈ horizontal offset position, the control circuit 24 abstracts values from the −²⁄₈" and −⅛" horizontal offset templates 68, and so on. It can be appreciated that the selection process 51 executed by the control circuit 24 to generate the stored value sets for comparison with the sensed value set 76 can be visualized as a matter of shifting left-right among the templates 68 and up and down within the templates 68 to produce the various stored value sets 72 shown in the table positions in FIG. 12.

It should be remembered however, that even though values are abstracted or selected to produce the stored valued sets 72, all the selected values in a stored value set may come from a single master template 70 which corresponds to a single note denomination having a particular orientation. As a result, when the values indicating levels of correlation are calculated and the highest one is found, the stored value set which produced this highest level of correlation will correspond to only one type identity.

Figure 13:
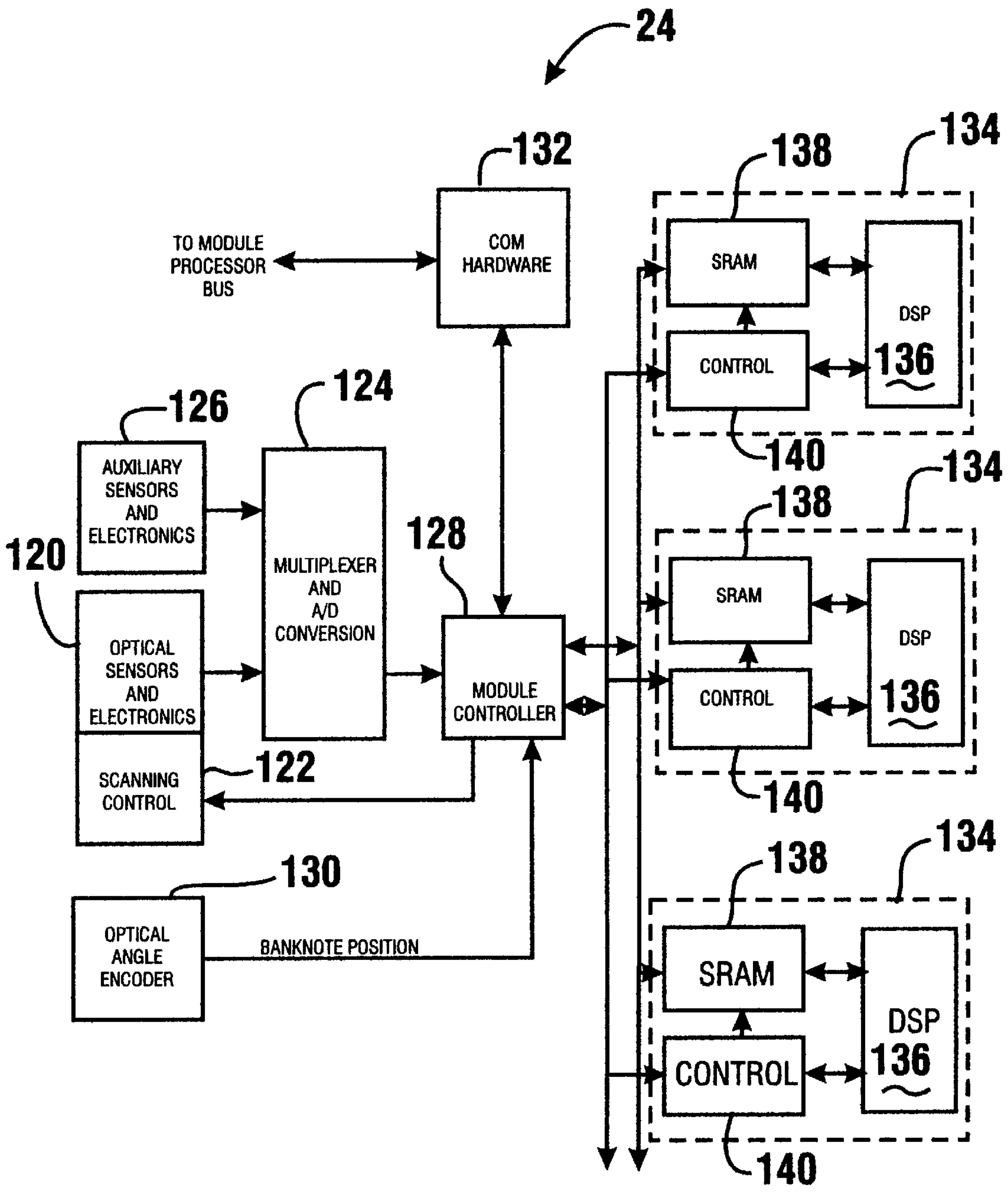
FIG. 13 is a schematic view of the control circuit of the preferred embodiment of the present invention.

The control circuit 24 of one preferred embodiment is schematically represented in FIG. 13. The control circuit 24 includes an optical sensors and electronics component 120. The optical sensors and electronics component includes the spot sensing assemblies 18 which produce the first and second signals which cause the control circuit 24 to generate the reflectance and transmission values.

The control circuit further includes a scanning control subassembly 122 which is in connection with the optical sensors and electronics component 120. The scanning control subassembly 122 actuates the emitters in the sequence to produce the synchronized first and second signals which correspond to each emitter type.

A multiplexer and analog to digital (A/D) converter component 124 is operative to receive the first and second signals from the spot sensing assemblies and to produce the raw reflectance and transmission values and to direct them to generate the sensed value set for each sensed note.

The control circuit 24 further includes an auxiliary sensors subassembly 126. The auxiliary sensors subassembly corresponds to the auxiliary sensors 28 previously discussed. These auxiliary sensors are preferably a type particularly tailored to the document or note type being sensed.

A module controller 128 is operative to receive data from and to control the operation of the other components of the system. The controller 128 is in connection with an angle encoder subassembly 130. The angle encoder subassembly 130 is operative to determine the skew angle of a note from the initial emitter signals as the note is sensed in the manner previously discussed. The control circuit 24 further includes a communications subassembly 132 which is operative to transmit signals to and from the controller 128. The communications subassembly transmits information to and from a larger system of which the apparatus is a part. It also delivers signals to and from input and output devices.

The controller 128 is in communication with a plurality of calculator modules 134. Each calculator module 134 includes a digital signal processor 136. Each digital signal processor 136 is in operative connection with a static random access memory 138. The memories 138 hold the stored values which are used to determine the level of correlation between the sensed value set and the generated stored value sets. Each memory 138 preferably holds a different group of the master templates 70.

Each calculator module 134 further includes a calculator controller 140. The calculator controllers are operative to produce the stored value sets from the templates in the memories 138. This is done based on angle of skew data provided by the controller 128. The calculator controllers are further operative to cause their associated digital signal processor to calculate the correlation values between the data values in the sensed value set and the stored value sets. The calculator controllers are further operative to control the associated digital signal processor to calculate the overall correlation coefficient for each stored value set, and to indicate the highest correlation value for the master templates handled by the particular calculator module.

The architecture of the described form of the control circuit 24 enables rapidly carrying out large numbers of calculations which are necessary to generate the stored value sets and to determine the correlation values for the sensed value set and all the stored value sets. The control circuit 24 has the advantage that each of the digital signal processors operates in parallel on the master templates stored in its associated memory. In addition, the processing capabilities of control circuit 24 may be increased by adding additional calculator and modules 134 to generate and correlate additional stored value sets. This enables correlating selective or addition al sensed values with stored data.

In operation of the control circuit 24 the controller 128 operates the scanning control subassembly 122 to sequence the emitters in the spot sensing assemblies, which are included in the optical sensors and electronics subassembly 120. The first and second signals corresponding to reflectance and transmission from each emitter are delivered to the multiplexer and A/D converter 124 which delivers digital reflectance and transmission values corresponding to each emitter. The multiplexer and A/D converter 124 also receives signals from the auxiliary sensors and electronics subassembly 126 and delivers appropriate signals from these to the controller 128 as well.

The controller 128 is operable to sense a note entering into proximity with the spot sensing assemblies and to produce the raw sensed value set. The angle encoder subassembly 130 is operative to determine the angle of skew from the raw sensed value set and to deliver the information to the controller 128. The controller 128 is further operative to modify the raw sensed value set and to deliver the modified sensed value set and the angle of skew data to each of the calculator modules 134.

The controller 128 is operative to determine the note length from the modified sensed value set and compare it to the length for a standard note based on the number of test spots obtained. If the sensed note does not have the proper length a signal indicative thereof is generated, and further processing for that note is not conducted.

Each calculator module 134 is operative to generate stored value sets from the stored values in the master templates in memories 138 based on the angle of skew. The calculator modules are further operative to calculate the correlation coefficient values for the modified sensed value set and each of the generated stored value sets. Each calculator module stores and communicates to the controller 128 the calculated overall correlation coefficient value for each of the generated stored value sets. Each calculator module provides this information along with the data identifying the master template which was used to generate the stored value sets, to controller 128, along with other selected correlation data that the calculator modules may have been programmed to provide.

The controller is operative to receive the signals from each of the calculator modules and to determine which master template produced the highest level of correlation with the sensed value set. The controller module is further operative to determine if the correlation value which is the highest, is over a first threshold which indicates that the level of correlation is likely to be indicative of the note type associated with the particular master template.

The controller 128 then transmits signals to the communication subassembly 132 indicative of the note type identified or signals indicative that the note identified is suspect because its highest correlation level is not above the threshold.

In alternative embodiments, the controller 128 may test to determine if the correlation value exceeds other thresholds and transmit signals indicative of the fitness of the note for further use, or other signals relating to the genuineness or suspect character of the note. The communication subassembly 132 transmits signals to a communications bus connected to the apparatus of the present invention and to other devices and systems which are operative to further process the note or provide information about the note.

While in the described embodiment the control circuit 24 is adapted to performing the calculating functions required for identifying the types of notes, in other embodiments other control circuit configurations may be used. Further, in one preferred form of the control circuit 24 the memories 38 which make up the data store may be programmed through the apparatus. This may be done in a setup mode as discussed by selectively positioning sample notes and moving them in controlled relation adjacent the spot sensing assemblies to gather the data necessary to produce the master templates.

This is done by having the module controller 128 control the operation of the note transport to move the sample notes at a speed which will enable gathering data at all the desired locations on the note. The controller 128 may also be programmed in the setup mode to receive signals indicative of the note type, and the transverse offset positions of the note used to provide template data in the memories 138 which comprise the data store.

Alternatively, the stored data may be produced in a different apparatus and loaded into the memories 138 through the controller 128 or from another source. In this approach stored values may be gathered from static analysis of sample notes.

In one preferred embodiment the optical sensors and electronic subassembly 120 further includes a compensator circuit that facilitates calibration of the spot sensing assemblies. In the preferred form of the invention the optical sensors and electronic subassembly is calibrated using a selected standard grade of white paper which is passed through the note transport adjacent to the spot sensing assemblies. In the calibration mode the optical sensors and electronic subassembly 120 is operative to adjust the amount of radiation generated by each of emitters to produce a preset output. This ensures that the level of radiation produced by each of the emitters is sufficient to correlate accurately with the stored value sets that are produced. Of course in other embodiments of the invention other types or reference material may be used for purposes of calibration.

Periodic calibration of the optical sensors and electronic subassembly 120 ensures that changes in the emitters over time or changes in the optical path due to accumulation of dust or other contaminants, will not adversely impact the accuracy of the apparatus. Due to the nature of light emitting diodes (LEDs) used for the emitters and the nature of the control circuitry which generally responds to relative values rather than absolute values, in the preferred embodiment calibration is required infrequently.

As can be appreciated from the foregoing description, preferred embodiments of the apparatus of the present invention present the advantage that they are capable of identifying notes that are presented in any orientation. It further operates to identify notes at high speed and without the need to have the notes precisely aligned or positioned with respect to a frame of reference.

The described embodiment of the present invention further has the advantage that it is readily adaptable to different types of currency notes or other document types, and can be used to detect suspect or counterfeit notes. The preferred form of the present invention is also readily adaptable to different types of notes, and may be programmed to simultaneously identify notes from different countries which have different properties and which are different sizes. Further, due to the data available, the preferred forms of the present invention may be programmed to analyze certain sensed values in greater detail and/or to detect or to point out characteristics or conditions that may be associated with double, unsuitably worn or counterfeit notes.

The preferred embodiments of the present invention further presents the advantages in being rapidly configured, programmed, readily calibrated and does not require frequent adjustment.

Thus, the apparatus of the present invention achieves the above stated objectives, eliminates difficulties encountered in the use of prior devices and systems, solves problems, and attains the desirable results described herein.

In the foregoing description, certain terms have been used for brevity, clarity, and understanding. However, no unnecessary limitations are to be implied therefrom because such terms are for descriptive purposes and are intended to be broadly construed. Moreover, the descriptions and illustrations given herein are by way of examples and the invention is not limited to the exact details shown or described.

In the following claims, any feature described as a means for performing a function shall be construed as encompassing any means capable of performing the recited function and shall not be deemed limited to the particular means shown as performing the recited function in the foregoing description, or mere equivalents.

Having described the features, discoveries, and principles of the invention, the manner in which it is constructed and operated and the advantages and useful results attained; the new and useful elements, arrangements, parts, combinations, systems, equipment, operations, methods, processes, and relationships are set forth in the appended claims.

We claim:

1. Apparatus for determining a condition of a note sensed by the apparatus in a note path comprising:

a radiation source on a first side of the note path, wherein when the note is positioned in the note path the radiation source directs radiation at a test spot on the note;

a first detector on the first side of the note path, wherein the first detector outputs a first signal responsive to radiation reflected from the test spot to the first detector;

a second detector on a second side of the note path, wherein the second detector outputs a second signal responsive to radiation transmitted through the test spot to the second detector; and a circuit in operative connection with a data store, wherein the circuit is operative to calculate a first value responsive to magnitudes of both the first signal and the second signal, and wherein the circuit is further operative to compare the first value and a threshold value, wherein the threshold value corresponds to at least one second value stored in the data store.

2. The apparatus according to claim 1 wherein the circuit is further operative to generate at least one output signal indicative of a result of the comparison of the first value and the threshold value.

3. The apparatus according to claim 2 wherein the circuit is further operative to generate reflectance and transmission values responsive to the first and second signals respectively, and wherein the output signal is indicative of a note type, and wherein the data store further includes data corresponding to a further threshold value stored in correlated relation with data representative of the note type, and wherein the circuit is operative to further compare a further value corresponding to at least one of the reflectance and transmission values to the further threshold value, and to generate a further signal indicative of a result of the further comparison.

4. The apparatus according to claim 2 wherein the threshold value corresponds to a double note, wherein the output signal is indicative of a double note.

5. The apparatus according to claim 2 wherein the threshold value corresponds to a worn note, wherein the output signal is indicative of a worn note.

6. The apparatus according to claim 2 wherein the threshold value corresponds to a soiled note, wherein the output signal is indicative of a soiled note.

7. The apparatus according to claim 2 wherein the threshold value corresponds to a genuine note, wherein the output signal is representative of a genuine note.

8. The apparatus according to claim 2 and further comprising a mechanism, wherein the mechanism is operative to transport the note responsive to the output signal.

9. The apparatus according to claim 8 wherein the mechanism includes a divert mechanism.

10. Apparatus for determining a condition of a note in a note path comprising:

a radiation source on a first side of the note path wherein when the note is positioned in the note path the radiation source directs radiation at a test spot on the note;

a first detector on the first side of the note path, wherein the first detector outputs a first signal responsive to radiation reflected from the test spot to the first detector;

a second detector on a second side of the note path wherein the second detector outputs a second signal responsive to radiation transmitted through the test spot to the second detector; and circuitry in operative connection with a data store, wherein the circuitry is operative to calculate a first value responsive to magnitudes of both the first signal and the second signal, and wherein the circuitry is further operative to compare the first value and a threshold value wherein the threshold value corresponds to at least one second value stored in the data store, wherein the circuitry is further operative to generate reflectance and transmission values responsive to the first and second signals respectively, and wherein the first value corresponds to a level of correlation between the reflectance and transmission values, and stored data values stored in the data store corresponding to reflectance and transmission properties adjacent to the test spot for at least one known note type.

11. The apparatus according to claim 10 wherein the note is a first note type, and wherein the data values correspond to the transmission and reflectance properties adjacent the test spot for a plurality of known note types, including the first note type.

12. The apparatus according to claim 11 wherein the data store includes at least one second value corresponding to a first threshold value and a second threshold value, and wherein the circuitry is operative to compare the first value to both of the first threshold value and the second threshold value.

13. The apparatus according to claim 12 wherein the circuitry is operative to generate at least one output signal indicative of a result of the comparison of the first value and the first threshold value and the second threshold value.

14. The apparatus according to claim 12 wherein the first threshold value corresponds to a genuine note and the second threshold value corresponds to a less than desired condition of a genuine note.

15. The apparatus according to claim 14 wherein the second threshold value corresponds to a double note.

16. The apparatus according to claim 14 wherein the second threshold value corresponds to a worn note.

17. The apparatus according to claim 14 wherein the threshold value corresponds to a soiled note.

18. Apparatus for determining a condition of a note in a note path comprising:

a radiation source on a first side of the note path, wherein when the note is positioned in the note path the radiation source directs radiation at a test spot on the note;

a first detector on the first side of the note path, wherein the first detector outputs a first signal responsive to radiation reflected from the test spot to the first detector;

a second detector on a second side of the note path, wherein the second detector outputs a second signal responsive to radiation transmitted through the test spot to the second detector; and circuitry in operative connection with a data store, wherein the circuitry is operative to generate reflectance and transmission values responsive to the first and second signals respectively for a plurality of test spots on the note, and wherein the circuitry is operative to calculate a first value that corresponds to a highest level of correlation between a plurality of data values stored in a data store and the transmission and reflectance values from the plurality of test spots on the note, wherein the stored data values stored in the data store correspond to reflectance and transmission properties at each of the plurality of test spots for each of a plurality of known note types, and wherein the circuitry is further operative to compare the first value and a threshold value, wherein the threshold value corresponds to at least one second value stored in the data store, and wherein the circuitry is further operative to generate at least one output signal indicative of a result of the comparison of the first value and the threshold value, wherein the output signal is indicative of one of the note types, and wherein the data store further includes data corresponding to a further threshold value stored in correlated relation with data representative of the one note type, and wherein the circuitry is operative to further compare a further value corresponding to at least one of the reflectance and transmission values to the further threshold value, and to generate a further signal indicative of a result of the further comparison.

19. The apparatus according to claim 18 wherein the further value corresponds to reflectance values for a plurality of test spots on the note, and wherein the circuitry is operative to calculate the further value responsive to the reflectance values.

20. The apparatus according to claim 19 wherein the further value calculated by the circuitry corresponds to an average of a plurality of the reflectance values.

21. The apparatus according to claim 19 wherein the apparatus further comprises a plurality of radiation sources, wherein each radiation source generates radiation at a different frequency, and wherein each radiation source directs radiation at the test spots, and wherein the data values in the data store correspond to reflectance and transmission values for each radiation source at each of the plurality of test spots for each of the plurality of known note types, and wherein the highest level of correlation is calculated by the circuitry using reflectance and transmission values for at least two of the radiation sources.

22. The apparatus according to claim 21 wherein the data store includes data corresponding to a first further threshold value and a second further threshold value stored in correlated relation with data representative of the note type, and wherein the circuitry is operative to compare a first further value corresponding to at least one of the reflectance and transmission values from a second one of the plurality of radiation sources for the plurality of test spots to the second further threshold value, and wherein the further signal generated by the circuit is indicative of the result of at least one of the comparisons.

23. The apparatus according to claim 18 wherein the further value corresponds to transmission values for a plurality of test spots on the note, and wherein the circuitry is operative to calculate the further value responsive to the transmission values.

24. The apparatus according to claim 23 wherein the further value calculated by the circuitry corresponds to the average of a plurality of the transmission values.

25. A method for determining a condition associated with a note, comprising the steps of:

illuminating a test spot on the note with a radiation source;

sensing with a first detector radiation reflected from the test spot and generating a first signal responsive to the reflected radiation sensed;

sensing with a second detector radiation transmitted through the test spot and generating a second signal responsive to the transmitted radiation sensed;

calculating with a circuit a first value responsive to the magnitudes of both the first and second signals; and comparing with a circuit the first value and a threshold value, wherein the threshold value corresponds to at least one second value stored in a data store.

26. The method according to claim 25 and further comprising the step of:

generating an output signal with a circuit responsive to a result of comparing the first value and the threshold value in the comparing step.

27. The method according to claim 26 wherein the output signal generated in the comparing step is indicative that the note is a double note.

28. The method according to claim 26 wherein the output signal generated in the comparing step is indicative that the note is a worn note.

29. The method according to claim 26 wherein the output signal generated in the comparing step is indicative that the note is a soiled note.

30. The method according to claim 26 and further comprising the step of moving the note to a location with a mechanism responsive to the output signal.

31. The method according to claim 25 wherein in the comparing step the first value is compared to a first threshold value, and further comprising the step of:

further comparing the first value and a second threshold value, wherein the second threshold value corresponds to at least one second value stored in the data store.

32. The method according to claim 31 wherein the first threshold value corresponds to a genuine note, and wherein the second threshold value corresponds to a condition of a genuine note.

33. The method according to claim 32 wherein the condition is one of either a double note, a soiled note or a worn note.

34. A method for determining a condition associated with a note, comprising the steps of:

illuminating a test spot on the note with a radiation source;

sensing with a first detector radiation reflected from the test spot and generating a first signal responsive to the reflected radiation sensed;

sensing with a second detector radiation transmitted through the test spot and generating a second signal responsive to the transmitted radiation sensed;

calculating with a circuit a first value responsive to the magnitudes of both the first and second signals; and comparing with a circuit the first value and a threshold value, wherein the threshold value corresponds to at least one second value stored in a data store, wherein the first value corresponds to a level of correlation between data corresponding to the first and second signals and stored values in the data store corresponding to transmission and reflectance properties adjacent the test spot for at least one note type.

35. The method according to claim 34 wherein the calculating step further includes calculating the level of correlation between data corresponding to the first and second signals and stored values in the data store corresponding to transmission and reflectance properties adjacent the test spot for a plurality of note types, including the one type note.

36. A method for determining a condition associated with a note, comprising the steps of:

illuminating a plurality of test spots on the note with a plurality of radiation sources, wherein each radiation source emits radiation at a substantially different frequency from at least one of the other radiation sources;

sensing with a first detector radiation from each radiation source that is reflected from each of the test spots and generating a first signal responsive to radiation from each radiation source sensed as reflected from each of the test spots;

sensing with a second detector radiation from each radiation source that is transmitted through each of the test spots and generating a second signal responsive to radiation from each radiation source sensed as transmitted through each of the test spots;

calculating with a circuit a first value responsive to the magnitudes of both the first and second signals, wherein the first value is representative of a level of correlation corresponding to each of the first and second signals and stored values corresponding to transmission and reflectance values for each radiation source at each of the plurality of test spots for each of a plurality of note types; and comparing with a circuit the first value and a threshold value, wherein the threshold value corresponds to at least one second value stored in a data store; and generating an output signal with a circuit responsive to a result of comparing the first value and the threshold value in the comparing step, wherein the output signal corresponds to one of the note types.

37. The method according to claim 36 and further comprising the steps of:

storing in the data store data corresponding to at least one further threshold value in correlated relation with data corresponding to the one note type, wherein the further threshold value corresponds to a condition of the one note type;

calculating with a circuit a further value corresponding to at least one of the plurality of first signals and the plurality of second signals for at least one radiation source;

further comparing with a circuit the further value to the further threshold value; and generating with a circuit a further signal indicative of a result of the comparison in the further comparing step.

38. Apparatus for determining a condition of a note in a note path comprising:

a radiation source on a first side of the note path, wherein when the note is positioned in the note path the radiation source directs radiation at the note;

a first detector on the first side of the note path, wherein the first detector outputs a first signal responsive to radiation reflected from the note to the first detector;

a second detector on a second side of the note path, wherein the second detector outputs a second signal responsive to radiation transmitted through the note to the second detector; and circuitry in operative connection with a data store, wherein the circuitry is operative to calculate a first value responsive to magnitudes of both the first signal and the second signal, and wherein the circuitry is further operative to compare the first value and a threshold value, wherein the threshold value corresponds to a double note, whereby the circuitry is operative to determine if the note has a double note condition.

39. A method for determining a condition associated with a note, comprising the steps of:

illuminating the note with a radiation source;

sensing with a first detector radiation reflected from the note and generating a first signal responsive to the reflected radiation sensed;

sensing with a second detector radiation transmitted through the note and generating a second signal responsive to the transmitted radiation sensed;

calculating with a circuit a first value responsive to the magnitudes of both the first and second signals; and comparing with a circuit the first value and a threshold value, wherein the threshold value corresponds to a double note condition, whereby it is determined if the note is a double note.

* * * * *